(12) United States Patent
Bainville et al.

(10) Patent No.: US 12,487,816 B2
(45) Date of Patent: *Dec. 2, 2025

(54) SOFTWARE UPDATING

(71) Applicant: Apple Inc., Cupertino, CA (US)

(72) Inventors: Eric Bainville, Sunnyvale, CA (US); Ali Sazegari, Cupertino, CA (US)

(73) Assignee: Apple Inc., Cupertino, CA (US)

(*) Notice: Subject to any disclaimer, the term of this patent is extended or adjusted under 35 U.S.C. 154(b) by 380 days.

This patent is subject to a terminal disclaimer.

(21) Appl. No.: 16/949,828

(22) Filed: Nov. 16, 2020

(65) Prior Publication Data

US 2021/0132942 A1 May 6, 2021

Related U.S. Application Data

(63) Continuation of application No. 14/941,229, filed on Nov. 13, 2015, now Pat. No. 10,860,310.

(60) Provisional application No. 62/235,457, filed on Sep. 30, 2015.

(51) Int. Cl.
*G06F 8/71* (2018.01)
*G06F 8/65* (2018.01)
*G06F 8/658* (2018.01)

(52) U.S. Cl.
CPC .............. *G06F 8/71* (2013.01); *G06F 8/65* (2013.01); *G06F 8/658* (2018.02)

(58) Field of Classification Search
None
See application file for complete search history.

(56) References Cited

U.S. PATENT DOCUMENTS

| | | | |
|---|---|---|---|
| 5,946,700 A * | 8/1999 | Pongracz | G06F 11/1451 707/999.203 |
| 6,018,747 A * | 1/2000 | Burns | G06F 16/10 |
| 6,574,657 B1 | 6/2003 | Dickinson | |
| 6,651,249 B2 | 11/2003 | Waldin et al. | |
| 6,802,061 B1 | 10/2004 | Parthasarathy | |
| 6,832,373 B2 | 12/2004 | O'Neill | |
| 6,925,467 B2 | 8/2005 | Gu et al. | |
| 6,970,866 B1 * | 11/2005 | Pravetz | G06F 16/10 707/999.102 |
| 7,027,806 B2 | 4/2006 | Rajaram et al. | |
| 7,068,273 B2 | 6/2006 | Takahama et al. | |
| 7,089,550 B2 | 8/2006 | Bakke et al. | |
| 7,308,683 B2 | 12/2007 | Johnson | |
| 7,409,685 B2 | 8/2008 | Chen et al. | |
| 7,523,452 B1 | 4/2009 | Kamity et al. | |
| 7,542,758 B2 | 6/2009 | Rajaram et al. | |

(Continued)

*Primary Examiner* — Bradley A Teets
*Assistant Examiner* — Melissa A Headly
(74) *Attorney, Agent, or Firm* — Kilpatrick Townsend & Stockton LLP

(57) ABSTRACT

A novel software updating method is provided. A target file is divided into segments, where some segments are updated by patching, while other segments are updated by archiving. The segmentation of the update allows very large files such as DYLD shared caches to be patched in-place, i.e., by using free space available within the file to perform patching rather than requiring enough free space on disk to store both the new version and the old version of the file. The segmentation of the update also allows each segment to be updated individually by the most optimal update method (copy, patch, or archive) so that the size of the update file can be minimized.

16 Claims, 17 Drawing Sheets

(56) References Cited

U.S. PATENT DOCUMENTS

| | | |
|---|---|---|
| 7,549,042 B2 | 6/2009 | Glaum et al. |
| 7,669,196 B2 | 2/2010 | Takizawa |
| 7,716,660 B2 | 5/2010 | Mackay |
| 7,721,000 B2 | 5/2010 | Kim |
| 7,725,890 B2 | 5/2010 | Kawaura |
| 7,805,719 B2 * | 9/2010 | O'Neill .................. G06F 8/658 717/168 |
| 7,865,479 B2 | 1/2011 | Gu et al. |
| 7,873,956 B2 | 1/2011 | Kim et al. |
| 7,937,699 B2 * | 5/2011 | Schneider ................ G06F 8/65 717/173 |
| 8,015,220 B1 | 9/2011 | Volkoff et al. |
| 8,156,071 B2 | 4/2012 | Gu et al. |
| 8,255,900 B2 | 8/2012 | Nishibayashi et al. |
| 8,260,829 B2 | 9/2012 | Volkoff et al. |
| 8,307,331 B2 | 11/2012 | Warila et al. |
| 8,607,219 B2 | 12/2013 | Minegishi |
| 8,683,458 B2 | 3/2014 | Schneider |
| 8,752,039 B1 | 6/2014 | Bapat |
| 8,856,773 B2 | 10/2014 | Kawaura |
| 8,893,115 B2 | 11/2014 | Nagamine et al. |
| 8,904,374 B2 | 12/2014 | Nakamura |
| 9,092,472 B1 * | 7/2015 | Gupta .................... G06F 16/25 |
| 9,098,376 B2 | 8/2015 | Resch |
| 9,361,088 B2 | 6/2016 | Chen et al. |
| 9,411,621 B2 | 8/2016 | Jeswani et al. |
| 9,554,268 B2 | 1/2017 | Rajaram et al. |
| 9,792,109 B2 | 10/2017 | Bainville et al. |
| 9,841,970 B2 | 12/2017 | Vangelov |
| 10,140,113 B2 | 11/2018 | Li |
| 10,203,951 B2 | 2/2019 | Song et al. |
| 2003/0182414 A1 | 9/2003 | O'Neill |
| 2004/0003266 A1 | 1/2004 | Moshir et al. |
| 2004/0093597 A1 * | 5/2004 | Rao .......................... G06F 8/65 717/171 |
| 2004/0215755 A1 | 10/2004 | O'Neill |
| 2005/0055595 A1 | 3/2005 | Frazer et al. |
| 2006/0112152 A1 | 5/2006 | Napier et al. |
| 2006/0225072 A1 | 10/2006 | Lari et al. |
| 2007/0089108 A1 | 4/2007 | Chen et al. |
| 2007/0220504 A1 | 9/2007 | Eker |
| 2007/0294684 A1 * | 12/2007 | Kumashiro ............... G06F 8/65 717/168 |
| 2008/0201705 A1 | 8/2008 | Wookey |
| 2010/0031244 A1 | 2/2010 | Koba |
| 2011/0145807 A1 | 6/2011 | Molinie et al. |
| 2011/0173601 A1 | 7/2011 | de los Reyes |
| 2011/0209142 A1 | 8/2011 | Wookey |
| 2012/0054730 A1 | 3/2012 | Michishita |
| 2014/0101096 A1 * | 4/2014 | Pfeifle .................... G06F 16/23 707/609 |
| 2014/0281804 A1 | 9/2014 | Resch |
| 2015/0220317 A1 * | 8/2015 | Li .............................. G06F 8/61 717/169 |
| 2015/0220318 A1 * | 8/2015 | Mangaiahgari ......... H04L 67/10 717/172 |
| 2015/0309786 A1 | 10/2015 | Resch |
| 2016/0054990 A1 | 2/2016 | Qin |
| 2016/0124739 A1 | 5/2016 | Zongker |
| 2016/0182088 A1 | 6/2016 | Sipos et al. |
| 2016/0267273 A1 | 9/2016 | Sugawara |
| 2016/0321063 A1 | 11/2016 | Yang |
| 2017/0115982 A1 | 4/2017 | Zhu et al. |
| 2017/0308369 A1 | 10/2017 | Li |
| 2017/0344344 A1 | 11/2017 | Gass et al. |
| 2018/0157865 A1 | 6/2018 | Beals |

* cited by examiner

SOFTWARE UPDATING

IMPROVED SOFTWARE UPDATING

This application is a continuation of co-pending U.S. patent application Ser. No. 14/941,229, filed on Nov. 13, 2015, which claims the benefit of U.S. Provisional Patent Application No. 62/235,457, filed on Sep. 30, 2015. U.S. Provisional Patent Application 62/235,457 is incorporated herein by reference.

BACKGROUND

The main obstacle for over the air (OTA) software updates is free space requirements. For each file to be modified during an OTA system update, one can either apply a patch that transforms an old version of the file into its corresponding new version, or by replacing the old version with the new version from a compressed archive. For files whose new version and old version differ little, updating a file by patching generally requires a smaller update file than by archiving.

The downside of patching is that it requires both the old version and the new version to be present on disk at the same time. For very large files, such as the DYLD shared caches, having both old and new versions on the disk at the same time may require more free space than what is available on the disk, making update by patching impossible. One can eliminate the free-space requirement by archiving the new version of the file, unfortunately doing so requires a very large update package, even when the difference between the old version and the new version is very small. Typically, archiving the DYLD shared cache reduces free space requirement by 400 MB than by patching, but increases the update package size by 80 MB.

SUMMARY

Some embodiments of the invention provide a software updating method that divides a file into segments and updates the file segment-by-segment. In some embodiments, a target file is divided into segments, where some segments are updated by patching, while other segments are updated by archiving. The segmentation of the update allows very large files such as DYLD shared caches to be patched in-place, i.e., by using free space available within the file to perform patching rather than requiring enough free space on disk to store both the new version and the old version of the file. The segmentation of the update also allows each segment to be updated individually by the most optimal update method (copy, patch, or archive) so that the size of the update file can be minimized. In some embodiments, the update file includes a segment map that specifies the size of each segment in the updated file, the update method of each segment (copy, patch, or archive), and the position of the segment in the original file (if copy or patch).

In some embodiments, the in-place patching operations utilize the available free spaces within the file to move data around in order create room for the new version of each patch or copy segment. In some embodiments, the new version of the patch or copy segment is constructed at its new position as specified by the segmentation map. During this construction, as free space in the file is consumed to store the content of the new version, the content of the old version is vacated to open additional free space for subsequent update operations.

To facilitate the movement of data within the target file, some embodiments divide the file into a number of pages. To move data within the file, the updater in some embodiments moves the pages around the file to create the necessary room. In order to track the movement of these pages, some embodiments employ a number of page-tracking tables that tracks the use and the position of each page.

Some embodiments invention provides a method for generating an update package that segments the updating of a file. In some embodiments, the method divides the file to be updated into segments, compares old and new versions of each segment and determines whether the segment should be updated by copying, patching, archiving. Some embodiments also checks whether the generated update file allows the update to be performed in-place, i.e., having enough free space within the file during update process. To do this check, some embodiments emulate the behavior of the computing device that receives the update package and performs the in-place updating to see if there would be enough free space within the target file. In some embodiments, if the update package generator determines that the target file would not have enough free space to complete updating in-place, it would change the update type/method of some of the segments from patch/copy to archive.

In some embodiments, such an update package is for updating a bundle of files, e.g., for updating an entire operating system. Such an update package can be very large, requiring a lot of storage space to download and store thus leaving very little free space on the disk to perform the actual update (e.g., storing old and new versions for patching operations, storing expanded archive data, etc.)

Some embodiments provide a method for updating a bundle of files from an update package that minimize the free space requirement on disk. The method segments the update of the entire package and performs the update in multiple passes. Specifically, some embodiments divide the archive payload of the entire update package into pieces and expand one piece of the archive in each pass. At the end of each pass, some embodiments remove from the disk the archive piece expanded in that pass in order to free additional space for the next pass.

In some embodiments, the update package is for updating the operating system or an entire disk of a computing device. Such update package includes updates for the system partition and/or the user partition of the disk. The update operation in each pass resizes the system partition in order to store system partition data expanded from the corresponding archive piece of that pass. Some embodiments resize the system partition gradually over the multiple passes rather than all at once in order to leave as much as space as possible for user partition during each pass.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a software updating method that divides a file into segments and updates the file segment-by-segment. In some embodiments, a target file is divided into segments, where some segments are updated by patching, while other segments are updated by archiving. The segmentation of the update allows very large files such as DYLD shared caches to be patched in-place, i.e., by using free space available within the file to perform patching rather than requiring enough free space on disk to store both the new version and the old version of the file. The segmentation of the update also allows each segment to be updated individually by the most optimal update method (copy, patch, or archive) so that the size of the update file can be minimized. In some embodiments, segmenting the updated allows DYLD shared cache to be updated without the 400 MB of free space for patching and without the 80 MBs increase in update file size for archiving.

Several more detailed embodiments of the invention are described below. Section I further describes segmented update of a file. Section II describes the generation of an update package by using segmented update. Section III describes a method for expanding an archive in multiple passes in order to reduce requirement for free disk space. Section IV describes an electronic system with which some embodiments of the invention are implemented.

I. Segmented Updating

Figure 1:
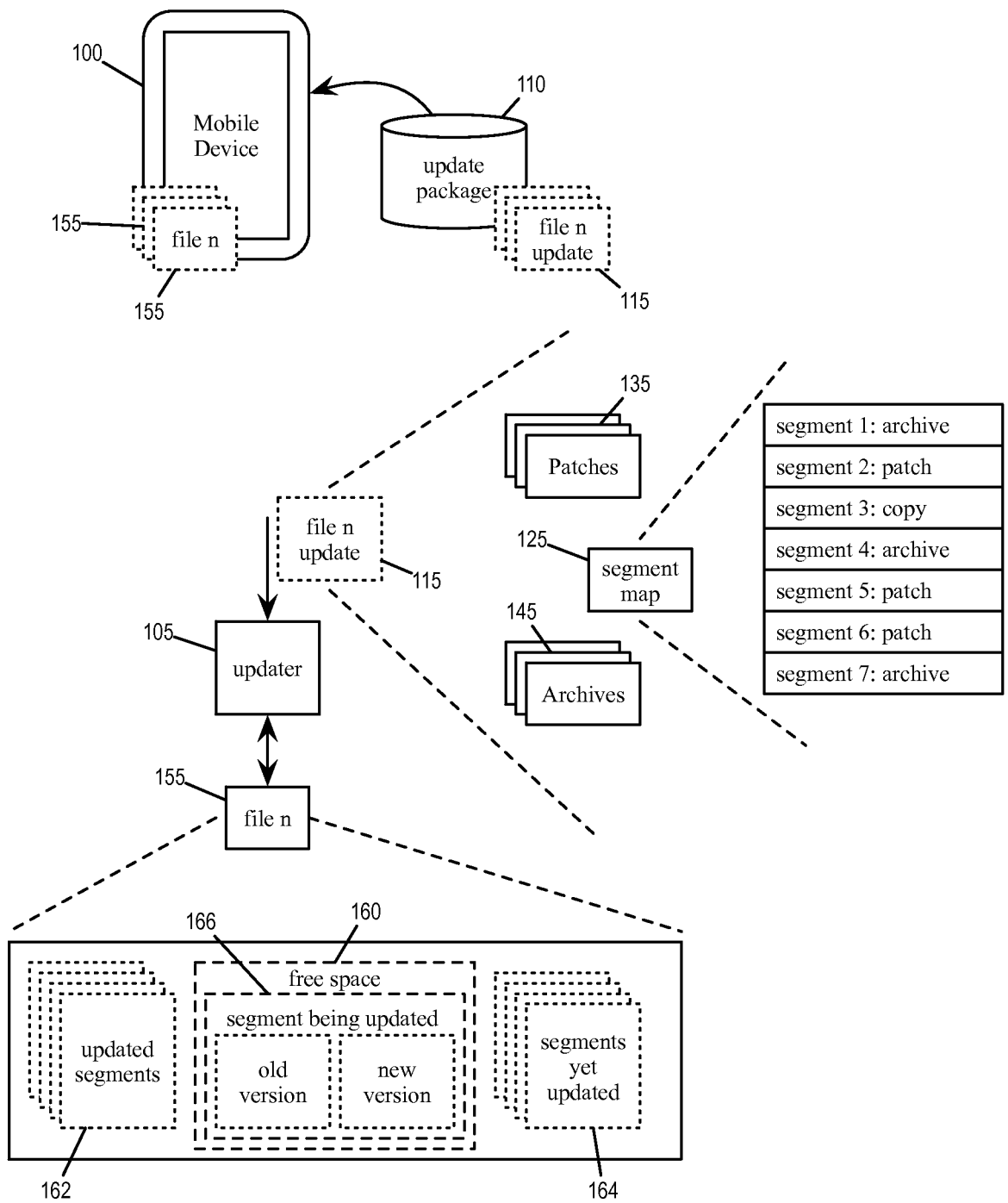
FIG. 1 illustrates the updating of a file by segmented updating according to some embodiments of the invention.

For some embodiments of the invention, FIG. 1 illustrates the updating of a file by segmented updating according to some embodiments of the invention. The figure illustrates a computing device 100 receiving an update package 110 and using the received update package to update its stored files 150.

The computing device 100 is illustrated as a mobile device receiving the update package 110 wirelessly or over the air. Such a computing device can be a smart phone, a tablet, a laptop, a desktop, or any computing device that is capable of receiving data wirelessly. Though not illustrated, the computing device 100 can also be an electronic device that is capable of receiving the update package over other mediums, such as by wired cable (e.g., Ethernet) or by portable storage medium (e.g., flash drives). The computing device 100 receives and stores the update package 110. The information in the received update package 110 is then used by an updater 105 executing in the computing device 100 to update the files 150 of the computing device 100.

The update package 110 includes several sets of update information for several files in the electronic device 100, including a set of update information 115 ("file n update") for updating one particular file 155 ("file n"). This file being updated is also referred to as the target file as it is the target of the update. In some embodiments, the update package 110 is for updating files of an operating system running on the computing device 100, and the particular file 155 being updated is a very large library file such as the DYLD shared cache for updating iOS® or OS X®.

The updater 105 of the computing device 100 takes the set of update information 115 and updates the corresponding target file 155. The set of update information 115 for updating the file 155 (file n) is also referred to as the update file for the target file 155. The set of update information 115 (or update file 115) segments the target file 155 into segments or sections that are to be updated by one copying, patching, or archiving.

The update file 115 includes a segment map 125, patch payload 135, and archive payload 145. The segment map 125 designates each segment as "copy", "patch", or "archive". The updater 105 in turn uses the patch data in the patch payload 135 to update segments that are designated as "patch" segments and use the compressed data in the archive payload 145 to update segments that are designed as "archive" segments. Segments updated by archiving have their content replaced entirely by compressed data in the archive payload 145. Update by archive is therefore also referred to as a full-update. Segments updated by patching uses differential data in the patch payload 135 to construct updated/new version of the segment from the original/old version of the segment. Segments updated by copying use the data of the old version of the segment as the data of the new version. Some embodiments therefore treats copy segments as patch segments without differential data.

In some embodiments, a segment map (e.g., 125) includes multiple entries, each entry correspond to a segment of the file to be updated. Each entry in some embodiments specifies the size of the segment in the updated file and/or the size of the segment in the original file, the type of segment (copy/patch/archive), and the position of the segment in the original file (if copy or patch). Some embodiments also specify an offset of the segment and a size of the segment's payload.

As mentioned, the file 155 is updated segment by segment. The figure illustrates the file 155 during the updating process, some segments are already updated (updated segments 162) to their corresponding new version, and some segments are not yet updated (not-yet-updated segments 164) and still have the old version. The updater 105 is updating a segment 166 by utilizing the free space 160 that is available in the file to store both the new and old versions of he segment. In some embodiments, this free space in the file 155 comes from segments that have been vacated.

The segmentation of the update file 115 therefore allows the updating of the file 155 to be performed "in-place", i.e., by using only the space already allocated to the file 155 to perform patching. This patching is done on a segment-by-segment basis, which requires only enough space to keep new and old version of the segment being updated (166) rather than the bulk of space needed to keep both the new and old version of the entire file 155.

Figure 2:
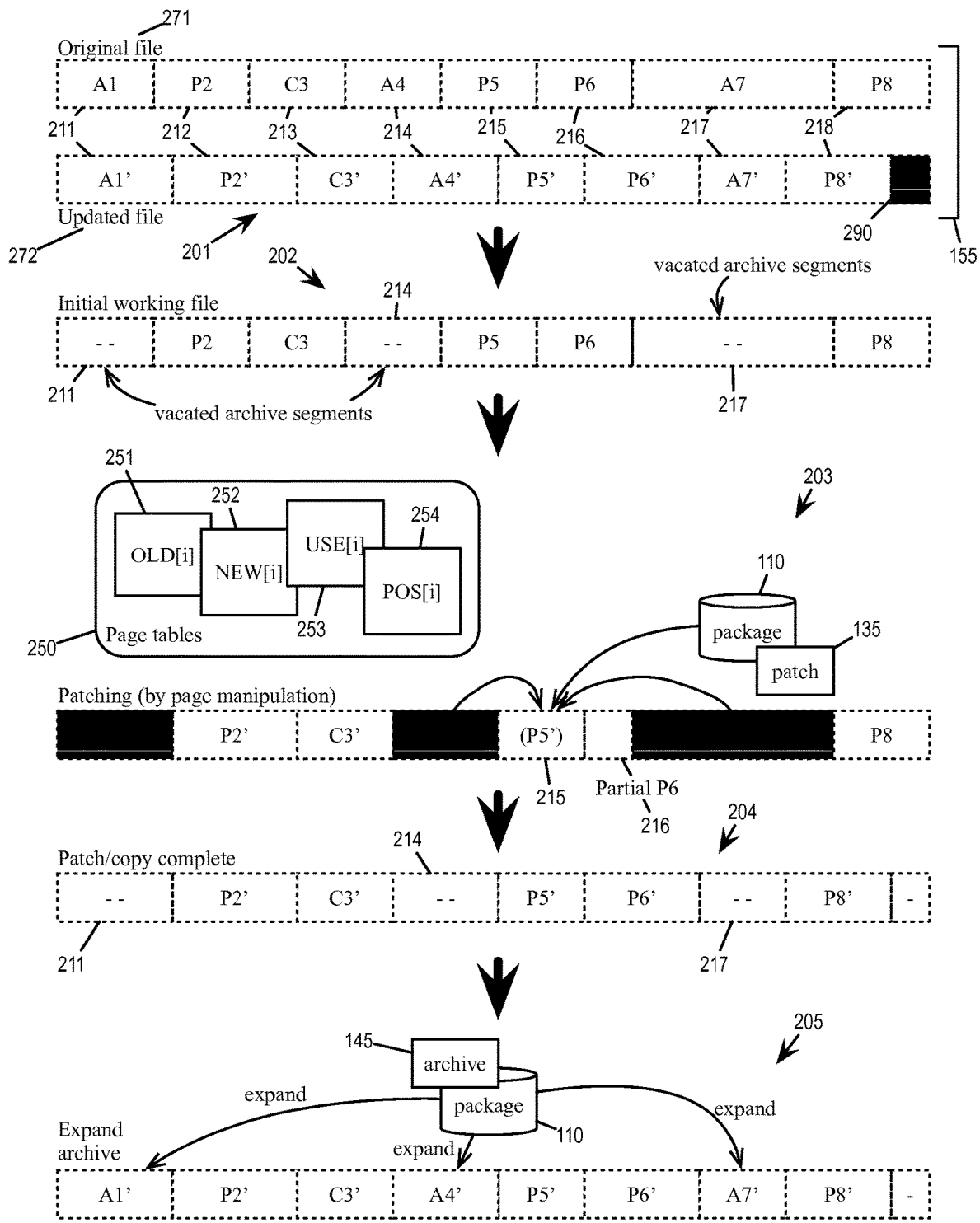
FIG. 2 illustrates the segmentation of a file during the segmented updating process.

FIG. 2 illustrates the segmentation of a file during the segmented updating process. The segmentation allows free space to be found within the file 155, which allows the file 155 to be patched in-place or in-file without using space outside of the file. The figure illustrates the in-place updating of the file 155 in five stages 201-205.

The first stage 201 shows the segmentation of the file 155 according to the segmentation map 125. As illustrated, the segmentation map 125 divides the file 155 into segments 211-218. This segmentation applies to the file 155 both before the updating process and after the updating process, and the figure at stage 201 illustrates the segment assignment in both the original version 271 and the new version 272 of the file 155. As mentioned, the segmentation map (125) specifies the size of each segment in the original file and in the updated file. Based on the sequencing of the segments in the segment map 125 and their corresponding sizes, the updater is able to identify the position (the start and the end) of each segment in the original file and in the updated file.

The segmentation map 125 also specifies the type of each segment. Specifically, the segments 211, 214, 217 are "A" segments to be updated by archives, the segments 212, 215, and 216 are "P" segments to be updated by patches, and the segment 213 is a "C" segment to be updated by copying. The old version of each segment is illustrated without a prime (A1, P2, C3, A4, P5, etc), while the new version of each segment is illustrated with a prime (A1', P2', C3', A4', P5', etc).

The second stage 202 shows the creation of free space within the file 155 by vacating archive segments ("A" segments). The data of the archive payload will expand to replace the original content of these segments, and the file update process does not need the original content of the "A" segments at all. Some embodiments therefore vacate the spaces occupied by "A" segments (i.e., 211, 214, 217), making them available as free space for subsequent updating of "P" and "C" segments. At the end of stage 202, only P and C segments remain, as the old versions of these segments are needed to construct their corresponding new versions.

The third stage 203 conceptually shows the in-place patching operations in progress. The in-place patching operation updates the "P" and the "C" segments in sequence, segment by segment. In some embodiments, the in-place patching operations utilize the available free spaces within the file to move data around in order create room for the new version of each "P" or "C" segment. In some embodiments, the new version of the "P" or "C" segment is constructed at its new position as specified by the segmentation map.

During this construction, as free space in the file is consumed to store the content of the new version, the content of the old version is vacated to open additional free space for subsequent update operations. As illustrated, the segment 212 ("P2") and the segment 213 ("C3") have been updated (illustrated as P2' and C3') to their corresponding new versions at their new positions by the updater. The updater is currently updating the segment 215 ("P5") by patching. The updater has moved parts of the segment 216 ("P6") elsewhere within the file to make room for the new version of P5 (illustrated as P5').

To facilitate the movement of data within the target file (155), some embodiments divide the file into a number of pages. To move data within the file, the updater in some embodiments moves the pages around the file to create the necessary room. In order to track the movement of these pages, some embodiments employ a number of page-tracking tables 250. As illustrated, these page-tracking tables include a "NEW" table, an "OLD" table, a "POS" table, and a "USE" table. The operations of these tracking tables during the in-file updating process will be further described by reference to FIGS. 4-5 below.

The fourth stage 204 shows the state of the file 155 at the completion of the patching operations. At this stage, all of the "C" and "P" segments have been updated, i.e., the patching operations have installed the new versions of segments 212, 213, 215, 216, and 218 at their new positions. (For a "C" segments, the in-place patching process installs the data of the old version at the new position of the segment in some embodiment). The completion of the in-place patching operations has left several slots of free spaces, some of which were used to hold content of the original "P" and "C" segment. These open slots correspond to "A" segments 211, 214, and 217, which have yet to be filled with data from the archive payload.

The final stage 205 shows the updating of the "A" segments. Specifically, the updater expands the compressed data in the archive payload 145 to fill the free space in the file 155 that are left for "A" segments 211, 214, and 217. Once the updater has filled space reserved for "A" segments, the updating of the file 155 is complete.

In the example of FIG. 2, the updated version of the file 155 is smaller than the original version of the file 155. Consequently, there is extra space 290 at the end of the updated file, some embodiments then resize the file 155 and de-allocate the extra space back to the system for other uses.

When the new version the target file is smaller than its old version, the updater in some embodiments assumes that there is already enough free space within the file to perform in-place patching. On the other hand, if the new version is larger than the old version, the updater in some embodiments would resize the target file to its eventual size in order to provide additional free space for the in-place patching operations.

Figure 3:
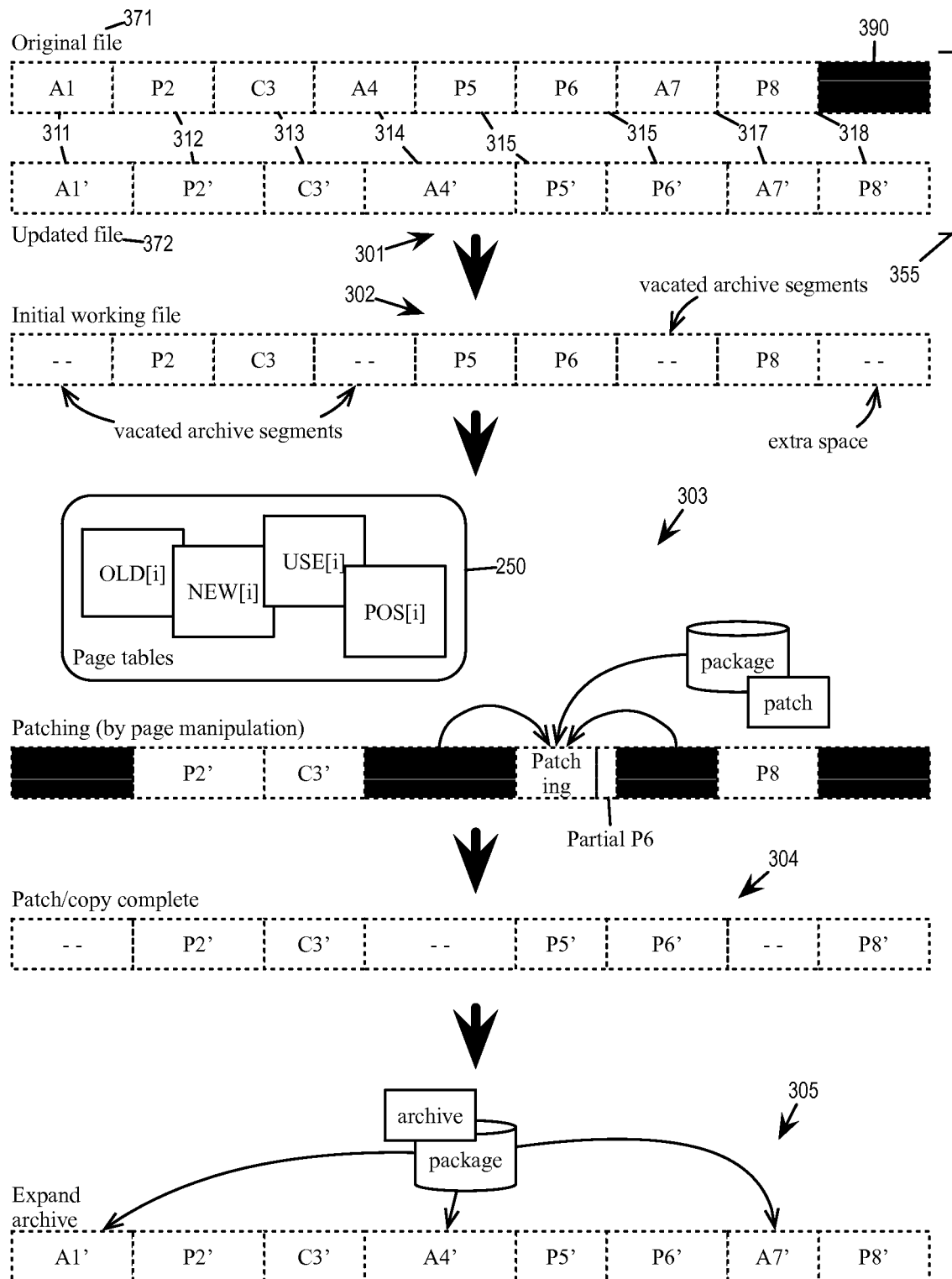
FIG. 3 illustrates the segmented updating process when the new version of the target file is larger than the old version.

FIG. 3 illustrates the segmented updating process when the new version of the target file is larger than the old version. The figure illustrates the updating of a file 355 according to a segmentation map (not illustrated) in five stages 301-305.

The first stage 301 shows the segment assignment in both the original version 371 and the new version 372 of the file 355. The segmentation map divides the file into segments 311-318. As mentioned, the segmentation map specifies the size of each segment in the original file and in the updated file, and the updater is able to determine the eventual size of the new version 372 file 355 after update. This new version size is larger than the old version 371, so the updater resizes the file 355 to its eventual updated size by allocating extra space 390. This resized file is thus the working file for the in-place updating process.

The second stage 302 shows the creation of free space within the file 355 by vacating "A" segments. In addition, the extra space 390 added to match the eventual size of the updated file is also useable as free space.

The third stage 303 shows the in-place patching operations in progress. The in-place patching operation updates the "P" and the "C" segments by moving content of those segments around by utilizing the free space that available within the resized file 355. Some embodiments divide the file 355 into pages and use page-tracking tables to move the content of the various segments by manipulating the pages.

The fourth stage 304 shows the state of the file 355 at the completion of the patching operations. The patching operations have installed the new versions of "P" and "C" segments 312, 313, 315, 316, and 318, while open slots of free space remain for "A" segments 311, 314, and 317.

The final stage 305 shows the updating of the "A" segments 311, 314, and 317 by expansion of compressed data in the archive payload. Once the updater has filled space reserved for "A" segments, the updating of the file 355 is complete. The size of the final updated file 355 is the same as specified by the segmentation map, i.e., the updating process has completely occupied/consumed the extra space 390 that was added by the initial resizing of the file 355.

As mentioned, some embodiments divide the target file into pages and perform in-place patching by moving, vacating, and filling these pages. In some embodiments, each of these pages has 4096 bytes. As mentioned above by reference to FIG. 2, some embodiments track the status, usage, position and movement of these pages by page-tracking tables/arrays, such as "OLD", "NEW", "POS", and "USE".

The "OLD" table is for mapping the indices of the pages in the original version of the file (e.g., 271) to their current positions in the file (as the file is being updated). In some embodiments, if a page is no longer in the file (e.g., vacated), the "OLD" table returns '0'.

The "NEW" table is for mapping the indices of the pages in the eventual new version of the file (e.g., 272) to their current positions in the file (as the file is being updated). In some embodiments, if a page is not yet in the file (e.g., not generated), the "NEW" table returns '0'.

The "USE" table is for mapping the indices of the pages in the file (as the file is being updated) to their use. In some embodiments, the use can be one of '0' (not used, or free), "N" (storing content of a new segment), or "O" (storing content of an old segment).

The "POS" table is for mapping the indices of pages in the file (as the file is being updated) to their indices in the eventual new version of the file or in the old version of the file. In some embodiments, the "POS" table returns '0' if it is free.

Figure 4:
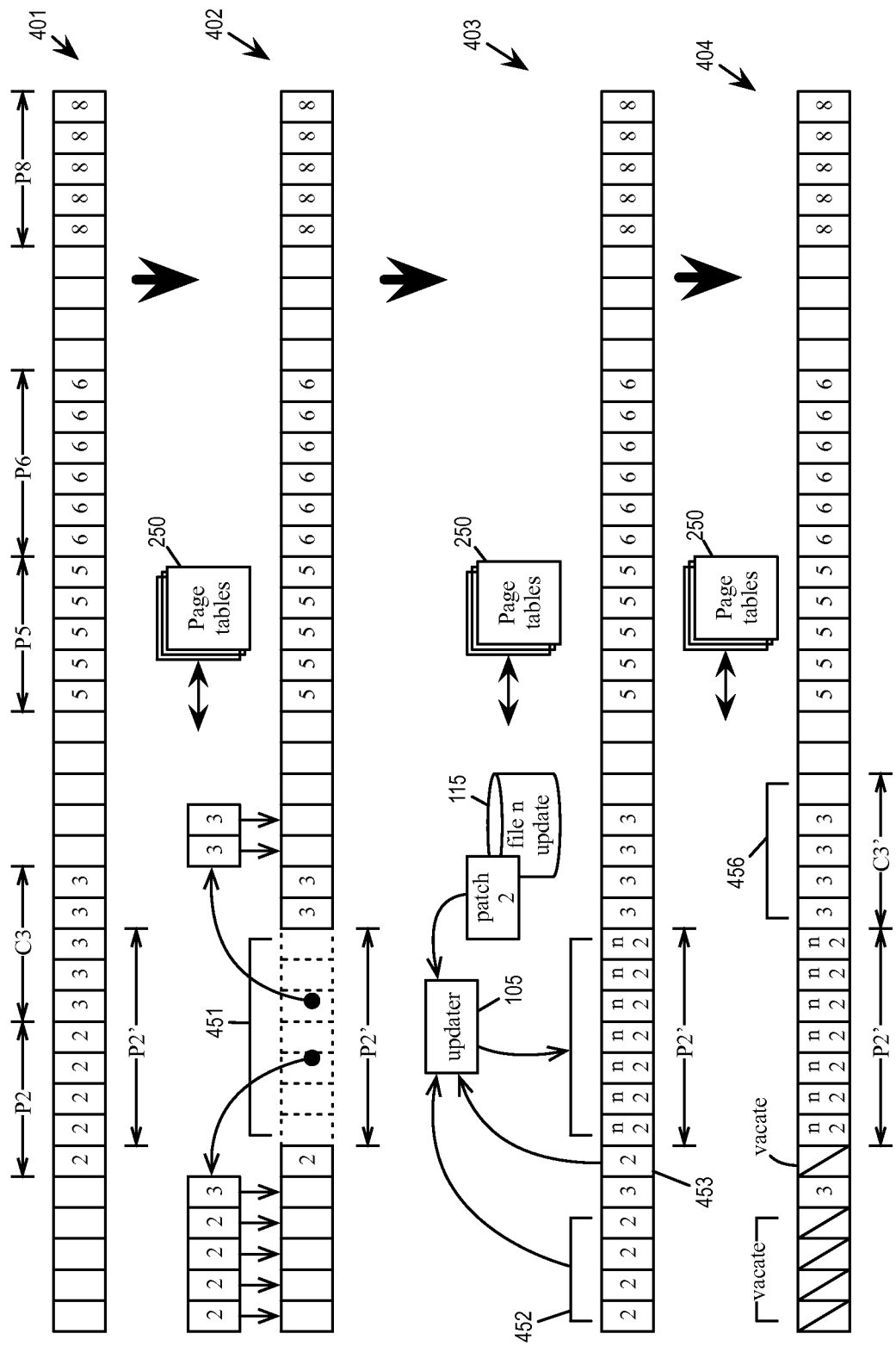
FIGS. 4-5 illustrate page-based in-place/in-file updating operations.
Figure 5:
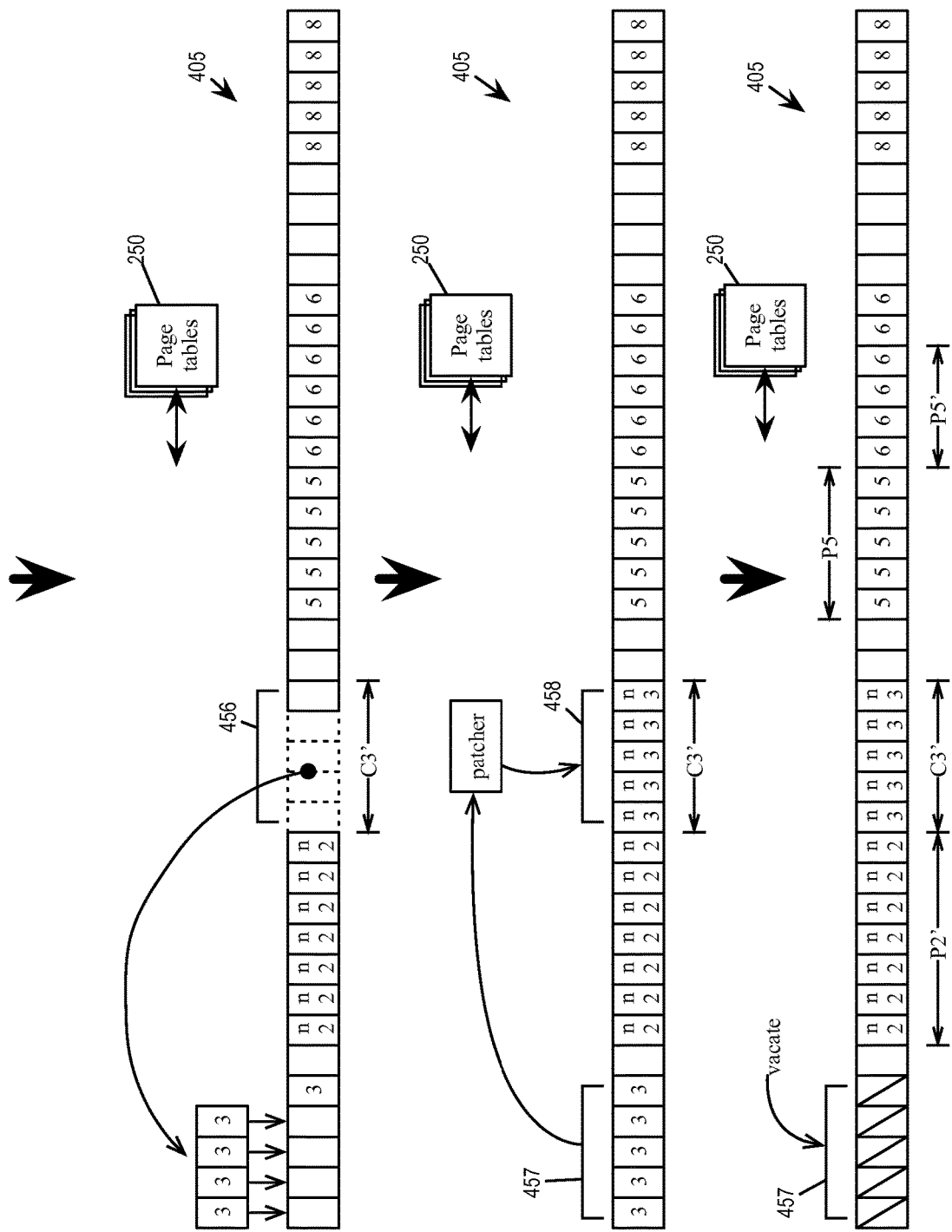

In some embodiments, the following is always true for the four page tracking tables: ("i" is index)
If OLD[i] is not Ø then USE[OLD[i]]=O and POS[OLD[i]]=i
If NEW[i] is not Ø then USE[NEW[i]]=N and POS[NEW[i]]=i
If USE[i] is O then OLD[POS[i]]=i
If USE[i] is N then NEW[POS[i]]=i FIGS. 4-5 illustrate page-based in-place/in-file updating operations. The example of FIG. 4-5 is based on the example target file 155 and corresponds to stages 202 and 203 of FIG. 2. Specifically the FIGS. 4-5 illustrate (i) the initial vacating of the "A" segments pages, (ii) the moving of pages to create room for a new segment, (iii) the generating of new segment pages by locating corresponding old segment pages, and (iv) the vacating of the corresponding old segment pages. FIGS. 4-5 illustrate the page-based in-place updating operations in seven stages 401-407.

The stage 401 shows the file 155 right after the updater initially segmented the file according to the segmentation map and vacated the "A" segments to create free space. As illustrated, the pages of segments P2 (212), C3 (213), P5 (215), and P8 (218) are holding data for their original versions (marked with '2', '3', '5', and '8', respectively), while all other pages (for "A" segments A1, A4, and A7) have been vacated to be free space (shown as blank).

Some embodiments initialize the page-tracking tables at the start of in-place updating operation when the updater first receives the segmentation map from the update package. Some embodiments initialize all the tables to Ø and then retain all the pages indices in segments marked copy or patch
OLD[i]=i, USE[i]=O, POS[i]=i
i.e. all these pages are used and at their initial positions in the old version of the file. This effectively vacates the "A" segment while keeping the original content "C" and "P" segments.

The second stage 402 shows the preparation for patching the segment P2. As illustrated, the new version of P2 (shown as P2') spans a number of pages that are currently occupied by pages 451 that are holding original data for segments P2 and C3. Consequently, the updater in some embodiments move these pages to free spaces elsewhere in the file 155 to make room for the new P2 segment (P2').

Some embodiments perform the movement of the pages by updating the page-tracking tables. Specifically some embodiments make room for the new version segment by doing the following:
for each page 'i' of the output segment, if USE[i] is not 0 then find a free page T outside the segment and move the contents of 'i' to 'j', i.e.,
USE[j]=USE[i], POS[i]=POS[j], OLD[POS[j]]=j. (assuming USE[i]=O)
USE[i]=Ø, POS[i]=Ø.

After this step, all pages spanned by the new version of the segment are free so the updater can perform copy/patch.

The third stage 403 shows the patching operation for the "P" segment P2. The updater 105 performs the patching operation based on the patching payload for P2 and the old segment content for P2. As illustrated, the updater retrieves the patching data for P2 from the update file 115 and locates the old version of the data for P2 by using the page tables 250. The old version of the data for P2 can be scattered all over the file 155 (pages 452 and 453), but the updater can use the page-tracking tables to locate them. The updater then creates the new version data for segment P2 by patching the old version data with the patch data. The updater stores the resulting new version data into pages that were vacated earlier for updated segment P2'. Each of these pages is illustrated as "n2". Correspondingly, the updater marks the pages of the new version segment P2 as used: for each page 'i' of the updated segment,
USE[i]=N and POS[i]=i.

Once the new version data of P2 has been generated and installed at its intended location, the updater vacates the pages storing P2's old version data, as these data are no longer needed by the updating process and can be discarded to make room for subsequent updating operations (patching, copying, or archive expansion). Correspondingly, for each page 'i' holding the old version segment, USE[OLD[i]]=∅, POS[OLD[i]]=∅, OLD[i]=∅.

The fourth stage 404 illustrates the vacating of the pages that were holding the old version data of P2 (pages 452 and 453, shown with slash).

FIG. 5 (stages 405-407) illustrates the in-place patching of the "C" segment C3. The data of a "C" segment is identical in both the original file and updated file, except for different location. In some embodiments, the updating of a "C" segment is similar to the updating of a "P" segment, but without patching differential data. Specifically, to update a segment by copying, the updater has to make room for the segment at its new location before moving its old version data into its new location. Some embodiments of the updater therefore handles "C" segment as it does "P" segments, except without retrieving any differential data from the patching payload.

The fifth stage 405 shows the preparation for copying the segment C3. As illustrated in FIG. 4, the new version of C3 (shown as C3') spans a number of pages 456 that are either free or currently occupied by pages that are holding original data of C3. However, the new version of the segment C3 is not located at the exact same location as the old version of the segment C3, so the pages holding the old version data of C3 has to be moved in order to make room for the updated C3' (though the data is identical). Consequently, the updater moves these pages and tracks their movement by using the page-tracking tables 250.

The sixth stage 406 shows the copying operation of the "C" segment C3. The updater 105 performs the patching operation based on the old segment content for C3. As illustrated, the updater locates the old version of the data for C3 by using the page tables 250. The old version of the data for C3 can be scattered all over the file 155 (in pages 457), but they can be located by using the page-tracking tables. The updater then copies the old version data from their original location (pages 457) into their new locations (pages 458). Each of these pages in the new location is illustrated as "n3". Correspondingly, the updater marks the pages of the new version segment C3 as used (USE[i]=N and POS[i]=i for each page 'i' of the updated segment.)

Figure 6:
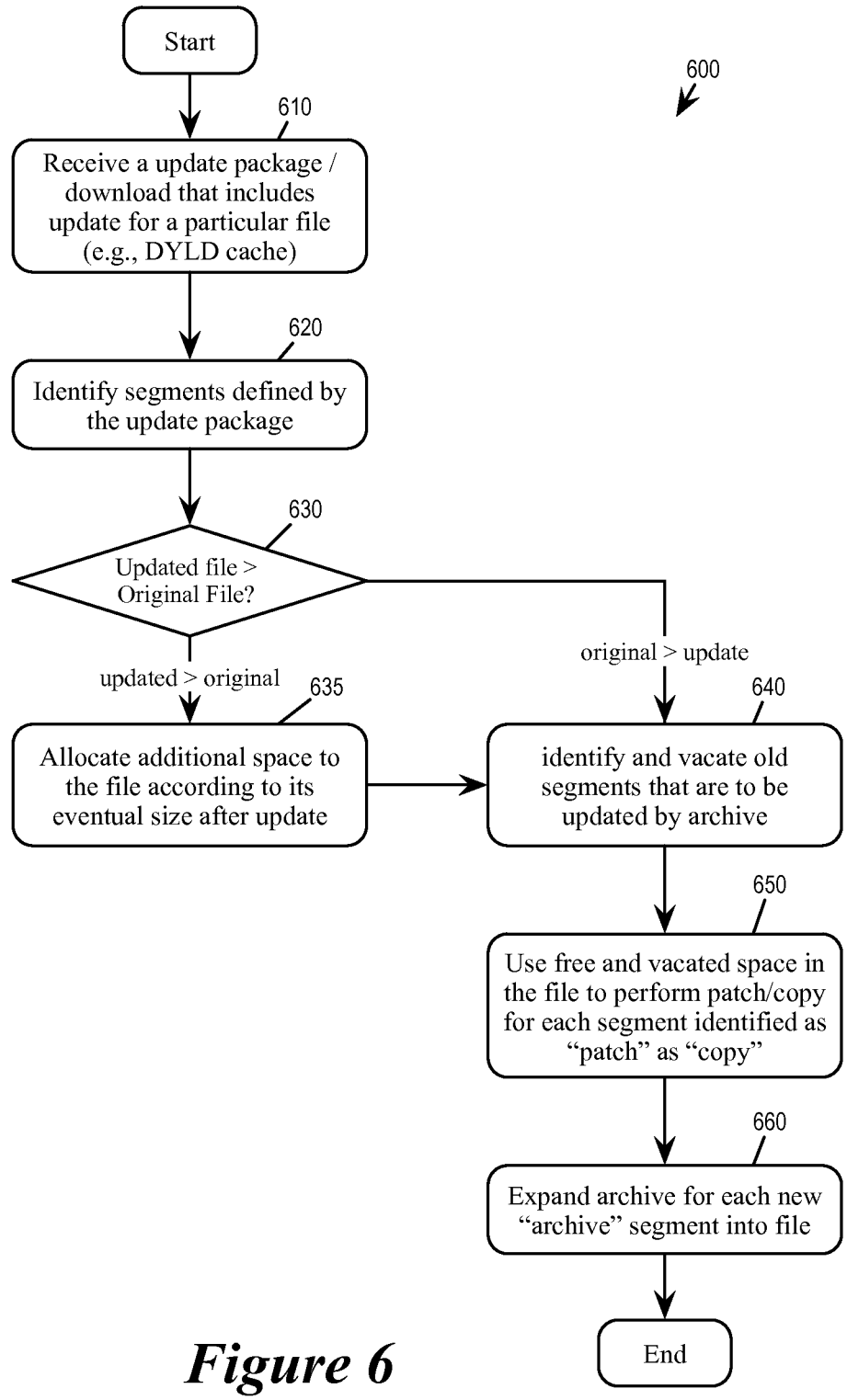
FIG. 6 conceptually illustrates a process for performing in-place update of a file.

Once the data of C3 has been copied to its intended new location, the updater vacates the pages storing C3's old version data, as these data are no longer needed by the updating process and can be discarded to make room for subsequent patching/copying operations. The seventh stage 407 illustrates the vacating of the pages that were holding the old version data of C3 (pages 457, shown with slash) and make them into free spaces For some embodiments, FIG. 6 conceptually illustrates a process 600 for performing in-place update of a file, i.e., by using only the space already allocated to the target file. In some embodiments, a computing device (e.g., 100) receiving an update package and performing file update performs the process 600. The process will be described by referencing the example of FIGS. 1-5.

The process starts when it receives (at 610) an update package or download that includes the update file for a particular file (e.g., the update file 115 "file n update" for the file 155 "file n"). In some embodiments, such a file is a very large library file such as a DYLD shared cache. The process then identifies (at 620) the segmentations defined by the update package. As illustrated in FIG. 1, the update package in some embodiments include a segmentation map (125), which defines the location/position, the type ("C", "P", or "A"), and the sizes of each segment in the original version of the file (271) and in the new version of the file (272).

The process then determines (at 630) whether the size of the original file is larger or size of the eventual updated file is larger. The eventual size of updated file can be determined from the segmentation map, which specifies the size of each segment in the original file as well as in the updated file. If the original version of the file is larger than the new version of the file, some embodiments assume there is going to be enough free space within the file and the process proceeds to 640. If the eventual size of the updated file is larger, the process proceeds to 635. The determination of whether to add this extra free space is described by reference to FIG. 3 above.

At 635, the process allocates (at 635) additional space to the file according to its eventual size. The additional space will be used as free space for subsequent in-file updating/patching operations. The process then proceeds to 640.

At 640, the process identifies segments that are to be updated by archive ("A" segments) and vacate them as free space. As mentioned, the old version data of these segments are not needed for determining the new version data of these segments, so some embodiments vacate them as free space for subsequent in-place updating/patching operations.

The process then uses (at 650) the free space made available earlier to perform patching or copying operations for each "P" or "C" segments in-file. The in-file patching/copying operation will be further described in detail by reference to FIG. 7 below. Some embodiments divide the target file into pages, and some of these embodiments perform the operations 640 and 650 by using page-tracking tables as described by reference to FIGS. 4 and 5 above.

Once each of the "P" and "C" segments have been patched and copied, the process expands (at 660) the compressed new version data in the archive payload of the update package for each "A" segment. Once the expanded data have been stored in their respective new segment locations, the process 600 ends.

Figure 7:
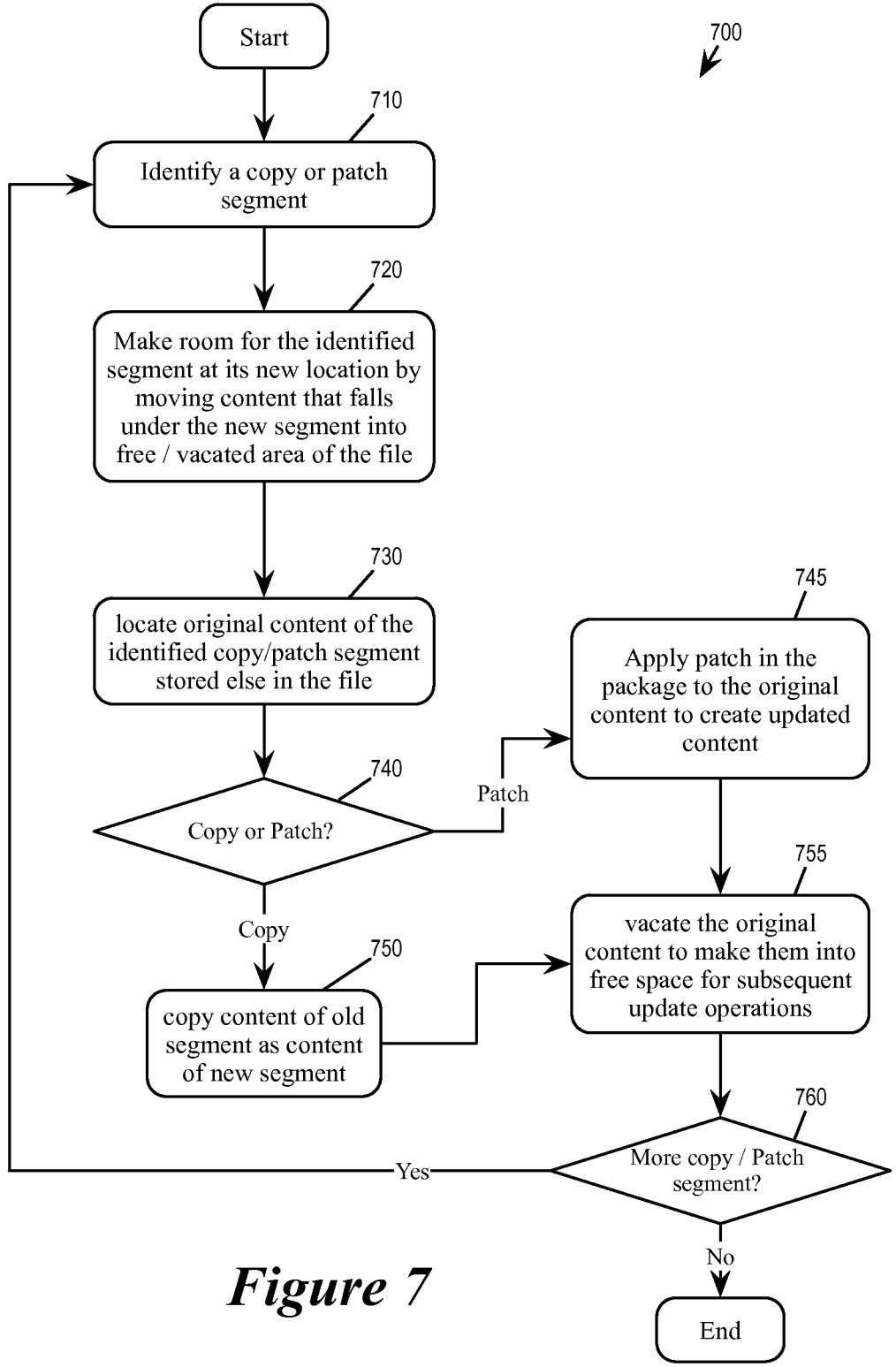
FIG. 7 conceptually illustrates a process for performing patch/copy operations for "P" and "C" segments.

FIG. 7 conceptually illustrates a process 700 for performing patch/copy operations for "P" and "C" segments. In some embodiments, the computing device performs the process 700 when it performs the operation 650 of FIG. 6 after the process 600 has already vacated the "A" segments.

The process 700 starts when it identifies (at 710) a "C" or "P" segment. The process then makes (at 720) room for the identified segment at its new location in the file by moving content that falls within that new location to the available free space within the file.

Next, the process locates (at 730) the original content of the identified "C" or "P" segment stored elsewhere in the file. Such content are often scattered all over the file when the process creates room for updated segments. Some embodiments use page-tracking tables to locate the original content as described above by reference to FIGS. 4 and 5.

The process then determines (at 740) whether the segment is a "C" segment to be updated by copying or a "P" segment to be updated by patching. If the segment is a "C" segment, the process proceeds to 750. If the segment is a "P" segment, the process proceeds to 745.

At 745, the process applies the patch (e.g., differential data) stored in the patch payload of the update package to the original content of the "P" segment located elsewhere in the file. The patching operation creates patched content of the segment, and the process installs the patched content to the segment's new location (that was just vacated in operation 720). The process then proceeds to 755.

At 750, the process copies the original content of the "C" segment located elsewhere in the file to the segment's new location. As mentioned, this operation is similar to the patching of "P" segment, except no patching differential data is applied. The process then proceeds to 755.

At 755, the process vacates the original content of the segment as it is no longer needed. The free space is available for use by subsequent in-place patching or copying operations. Some of these free space would eventually be used for storing data of updated "A" segments. The process then determines (at 760) if there is another "P" or "C" segments to be updated. If so, the process proceeds to 710. Otherwise the process 700 ends.

II. Generating Segmented Update Package

Some embodiments invention also provides a method for generating an update package that segments the updating of a file. In some embodiments, the method divides the file to be updated into segments, compares old and new versions of each segment and determines whether the segment should be updated by copying, patching, archiving.

Figure 8:
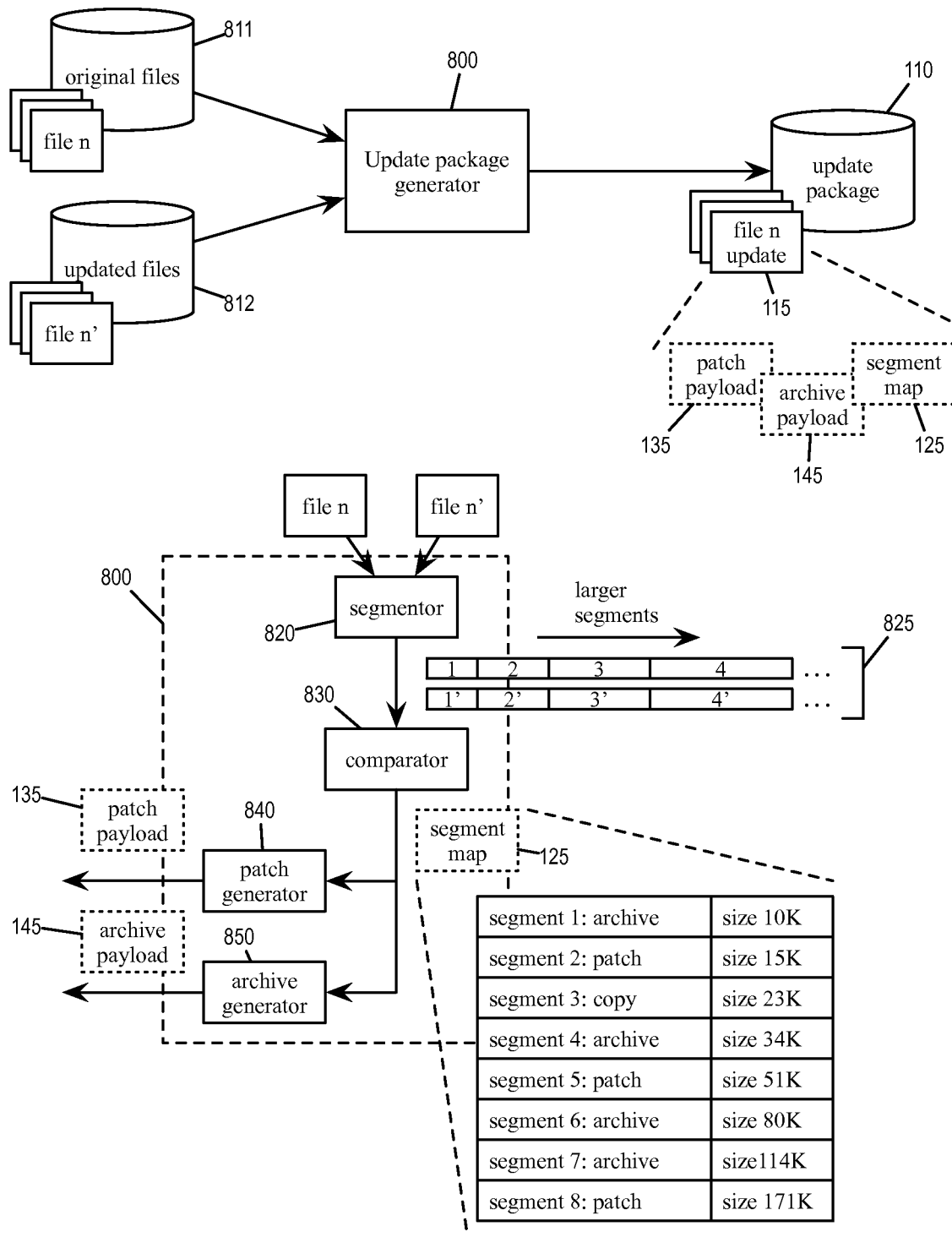
FIG. 8 illustrates an update package generating system for generating an update package using segmented updating.

FIG. 8 illustrates an update package generating system 800 for generating an update package using segmented updating. In some embodiments, such an update package generation system 800 operates in a server device that provides software update to client devices (e.g., 100).

As illustrated, the system 800 (or update package generator) is generating the update package 110 for updating for a set of files based on a set of original files 811 and a set of corresponding updated files 812. One of the files being updated is the file 155 (file n). For the file 155, the update package 110 includes the update file 115, which includes the segmentation map 125, the patch payload 135, and the archive payload 145.

The figure also illustrates the generation of the update file 115 from the old and new versions (file n and file n') of the file 155 by the system 800. As illustrated, the update package generation system 800 includes a segmentor 820, a comparator 830, a patch generator 840, and an archive generator 850. These components produce the segmentation map 125, the patch payload 135, and the archive payload 145 for the update file 115.

The segmentor 820 receives the old and new versions (file n and file n') of the file 155 and determines a segmentation scheme 825, i.e., the locations and sizes of each segment in the old version of the file as well as in the new version of the file. In some embodiments, the segmentor 820 produces progressively larger segments by e.g., following geometric progression.

The comparator 830 uses the segmentation scheme 825 and selects an updating method (copy, patch, or archive) for updating each segment. Some embodiments make this selection for each segment by comparing the old and new versions of the segment and selecting an updating method that results in smallest size for the update file. The comparator then produces the segmentation map 125 and designates the updating method/type of each segment (along with each segment's size and position in the original file and updated file.)

The patch generator 840 uses the segment map 125 to identify the segments that are to be updated by patching ("P" segments). For each of these segments, the patch generator generates its patch payload by e.g., computing the differential data between the old and new versions of the segment.

The archive generator 850 uses the segmentation map 125 to identify the segments that are to be updated by archiving ("A" segments). For each of these segments, the archive generator 850 compresses the content of the new version of the segment and store the compressed data as archive payload 145.

Figure 9:
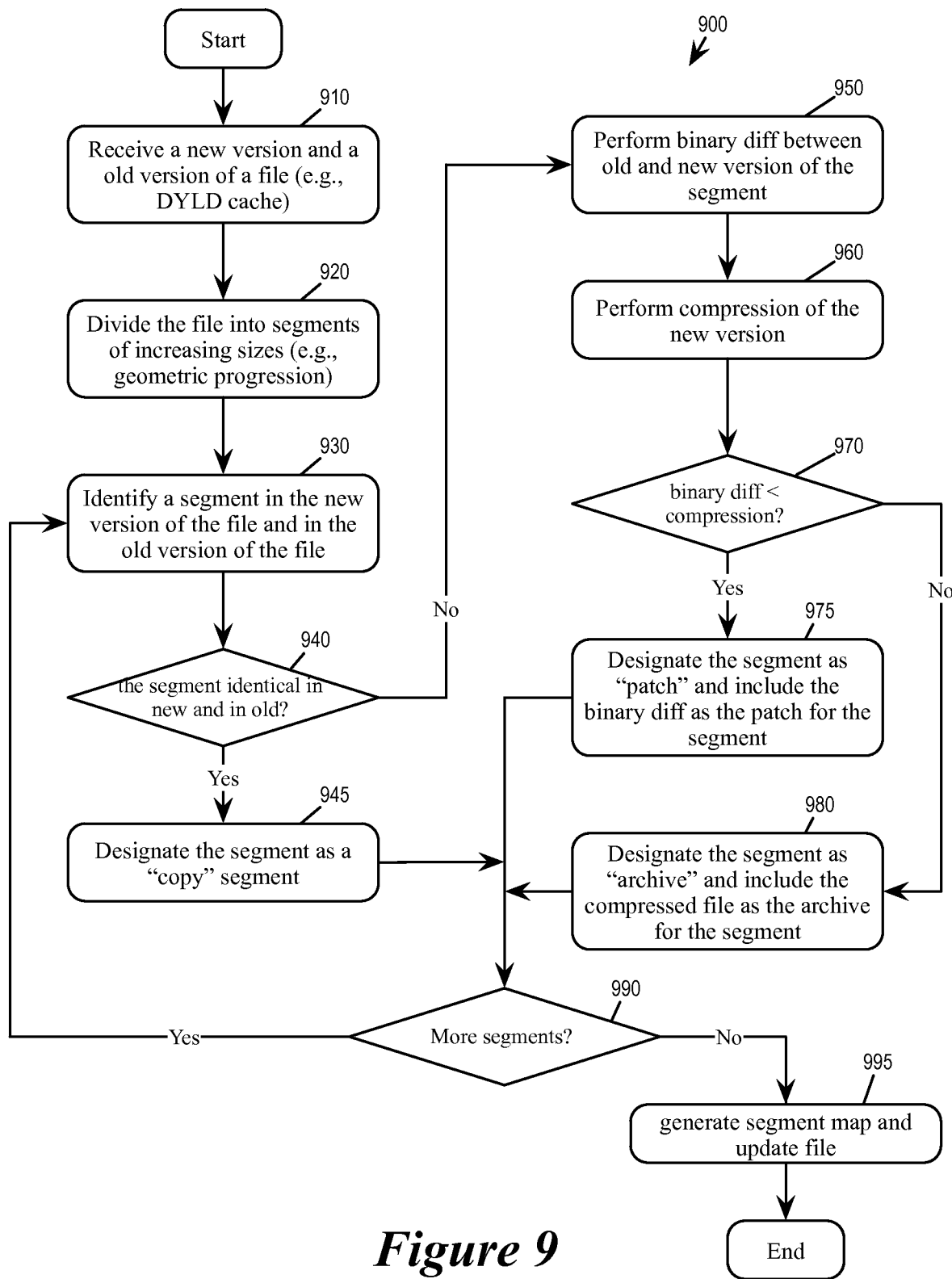
FIG. 9 conceptually illustrates a process for generating an update file using segmented updating.

FIG. 9 conceptually illustrates a process 900 for generating an update file using segmented updating. In some embodiments, the update package generator 800 performs the process 900 when generating the segment map 125, the patch payload 135, and the archive payload 145.

The process 900 starts when it receives (at 910) a new version and an old version of a file. In some embodiments, the file is a very large library file (such as DYLD shared caches) for an operating system update package. The process then divides (at 920) the file into segments. In some embodiments, the process defines segments to be of progressively larger size such that the later segments are larger than earlier segments.

The process then identifies (at 930) a segment and its corresponding data from the new version of the file and from the old version of the file. The process then determines if the new version of the segment is identical to the old version of the segment. If so, the process designates (at 945) the segment as a segment to be updated by copy ("C" segment") and proceeds to 990. Otherwise, the process proceeds to 950.

At 950, the process performs binary diff between the old and new versions of the segment. The process also performs (at 960) compression of the new version of the segment. The process then determines (970) whether the binary diff between old and new is smaller, or whether the compression of the new is smaller. If the binary diff between the old and new is smaller, the process designates (at 975) the segment as a "P" segment to be updated by patching and produces the corresponding patch payload based on the binary diff. If the compression of the new is smaller, the process designates (at 980) the segment as an "A" segment to be updated by archive and produces the corresponding archive payload based on the compressed new version segment. Once the process has designated the segment as a "P", "A", or "C" segment, it proceeds to 990.

At 990, the process determines if there is another segment for which the process has yet to identify an updating method. If so, the process returns to 930. Otherwise the process generates (at 995) the segmentation map that specifies each segment's information (size, location, updating method). The process also creates the update file from the generated segmentation map, the patch payload, and the archive payload. The process 900 then ends.

In addition to generating the segmentation map, the patch and archive payload, the update package generator in some embodiments also checks whether segmentation truly allows the update of the file to be performed in-place, i.e., would there be enough free space within the file during update process. To do this check, the update package generator in some embodiments emulates the behavior of the computing device (e.g., 100) that receives the update package and performs the in-place updating to see if there would be enough free space within the file.

In the in-file/in-place updating examples illustrated and discussed in Section I above, the computing device performing in-place updating have enough free space within the file because the segmentation map has identified enough "A" segments for the updater to vacate and provide sufficient free space. However, it is possible that the update package generator may initially produce a segmentation map that does not provide sufficient free space by failing to identify sufficient number of "A" segments (since the initial goal of the update package generation is to produce the smallest update file rather than making the update file larger just to have enough free space). Consequently, in some embodiments, if the update package generator determines that the file would not have enough free space to complete updating in-place, it would change the update type/method of some of the segments from patch/copy to archive.

Figure 10:
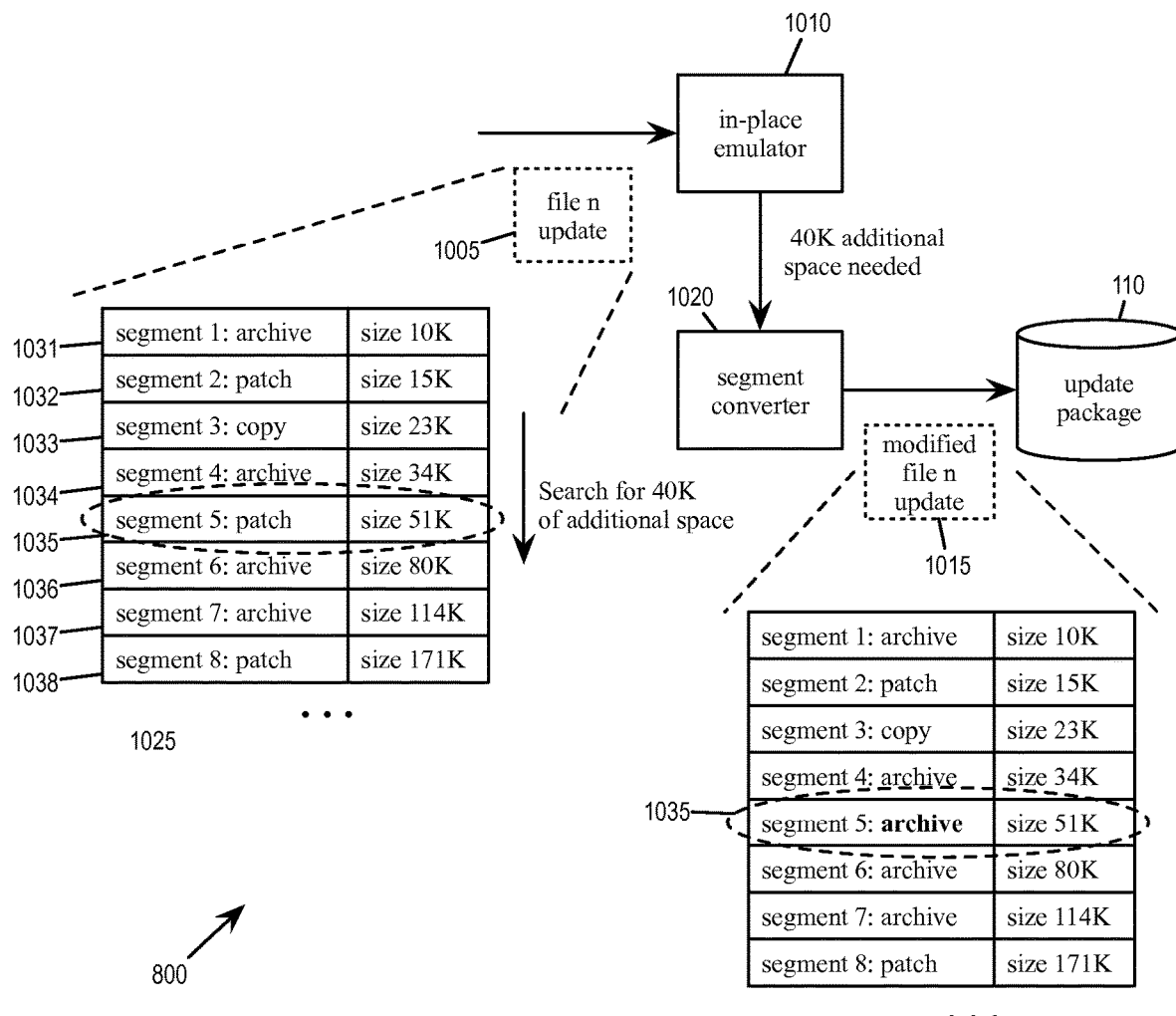
FIG. 10 illustrates the update package generator checking for sufficient free space for in-file updating.

FIG. 10 illustrates the update package generator checking for sufficient free space for in-file updating. As illustrated, the update generator 800 further includes an in-place emulator 1010 and a segment converter 1020. The in-place emulator 1010 is for emulating the in-place patching/updating operations that will be performed according to the update package. In other words, the emulator 1010 emulates the behavior of the updater 105 as described in Section I above. In this example, the emulator 1010 emulates in-place updating based on a proposed update file 1005 and a segmentation map 1025 included therein. The segmentation map 1025 has defined update segments 1031-1038. The update file 1005 is "proposed" because it has not been verified to have sufficient free space.

As illustrated, the emulator 1010 has emulated the in-place updating operations according to the update file 1005 and determined that the in-place updating needs at least 40K bytes of additional free space in-file. In order to provide the requisite amount of additional free space, the segment converter 1020 goes through the segment map 1025 to look for "P" or "C" segment to turn into an "A" segment.

To keep the oversize of the update package as small as possible, the segment converter 1020 in some embodiments looks for the smallest "P" or "C" segment that is large enough to provide the sufficient free space. As mentioned, in some embodiments, a segmentation map arranges the segments according to their sizes, and the sizes of the segments in the map follows a geometric progression. Consequently, the segment converter 1020 can follow the progression of segment sizes and stop at the first "P" or "C" segment that is large enough to provide the requisite free space.

In the example of FIG. 10, the segment map 1025 shows the segment sizes of the segments 1031-1038 follow a geometric progression: 10K, 15K, 23K, 34K, 51K, 80K, 114K, and 171K, etc. (geometric factor of 1.5). Since the emulator 1010 has determined that 40 KB of additional free space is needed, the converter 1020 stops at the "P" segment 1035 with size 51K. In some embodiments, this series of increasing segment sizes are the sizes of the original segments, because the original sizes of the segments determine how much additional free space would be made available by the vacating of the "A" segments.

Once the suitable "P" segment 1035 has been identified, the segment converter 1020 makes the segment 1035 into an A segment. In some embodiments, the segment converter 1020 makes this change by modifying the segment map 825 (to change the update method of the segment 1035 to archive) and by generating and including the archive payload for the segment 1035. The update package generator then creates a modified update file 1015 based on the newly modified segment and stores it in the update package 110.

In some embodiments, the geometric progression of the segment sizes does not apply to all segments of the file being updated. In some embodiments, some sections of the file contain segments that correspond to specific library parts (such as DYLIBs) which have specific sizes, and the update file generation process of some embodiments does not alter them to be part of the geometric progression. In some embodiments, only portions of the file that contains specific data types (such as constants or tables) are divided into segments with sizes according geometric progression but not others.

Figure 11:
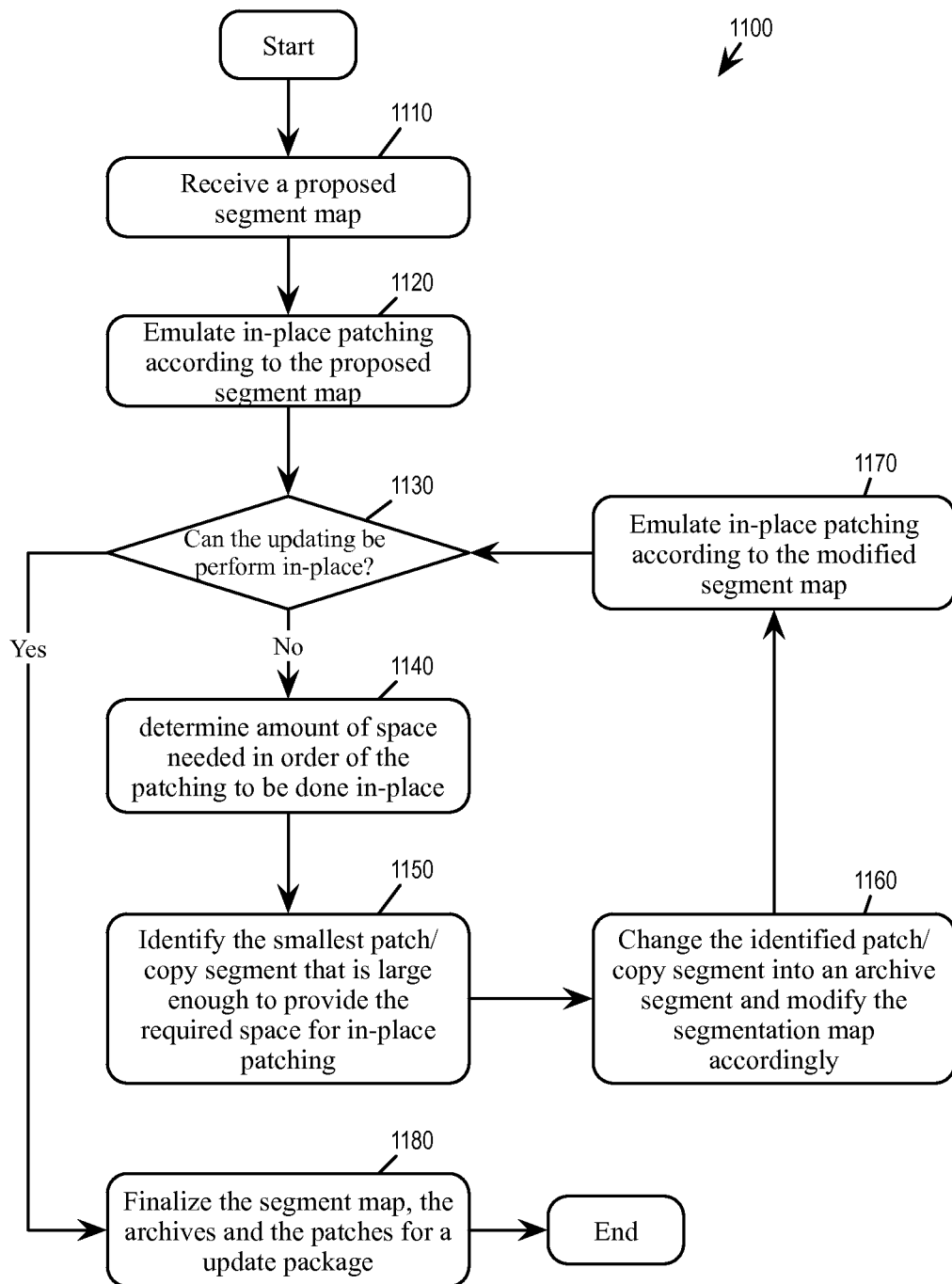
FIG. 11 conceptually illustrates a process for ensuring that an update file or segmentation scheme would have sufficient free space to perform in-place update/patching.

FIG. 11 conceptually illustrates a process 1100 for ensuring that an update file or segmentation scheme would have sufficient free space to perform in-place update/patching. The update package generator 800 in some embodiments performs this process (e.g., at its in-place emulator 1010 and its segment converter 1020).

The process 1100 starts when it receives (at 1110) a proposed update file. The process then emulates (at 1120) in-place patching/updating according to the update file and the segmentation map included therein. Based on the emulation, the process determines (1130) whether the file can be updated in-place, i.e., whether the in-place updating operation would have enough free space within the file to operate. If the emulation predicts that there will be enough space in-file, the process proceeds to 1180. If the emulation indicates that there won't be sufficient free-space in-file, the process proceeds to 1140.

At 1140, the process identifies or determines how much more additional free space is needed. Some embodiments make this determination by identifying the "P" or "C" segment for which the in-place updating emulation failed. The process then identifies (at 1150) the smallest patching or copying segment that is large enough to provide the required space for in-place patching. Some embodiments follow the geometric progression of segment sizes to find the smallest "P" or "C" segment that is large enough. In some embodiments, the system does not determine how much additional free-space is needed but instead always convert the smallest "P" or "C" segment to an "A" segment.

Next, the process changes (at 1160) the identified "P" or "C" segment into an "A" segment and modifies the segmentation map accordingly. The process then emulates (at 1170) the in-place updating/patching according to the modified segmentation map and returns to 1130 to determine if the updating can be performed in-place.

At 1180, the process finalizes the segmentation map, the archive payload, and the patch payload for the update package. Specifically, the process discards the patching data (differential between old and new) for the converted segments ("P" or "C" segments that have been converted to "A" segments) and replaces the patching data with the corresponding archive data (compressed new version). The process 1100 then ends.

III. Multi-Pass Archive Expansion

Sections I and II describe the segmenting of a file in order to perform update of the file in-place, where the information needed for the update is from a update package. In some embodiments, such an update package is for updating a bundle of files, e.g., for updating an entire operating system. Such an update package can be very large, requiring a lot of storage space to download and store thus leaving very little free space on the disk to perform the actual update (e.g., storing old and new versions for patching operations, storing expanded archive data, etc.)

Some embodiments minimize the free space requirement on disk by segmenting the update of the entire package and perform the update in multiple passes. Specifically, some embodiments divide the archive payload of the entire update package into pieces and expand one piece of the archive in each pass. At the end of each pass, some embodiments remove from the disk the archive piece expanded in that pass in order to free additional space for the next pass.

In some embodiments, the update package is for updating the operating system or an entire disk of a computing device. Such update package includes updates for the system partition but is stored in the user partition of the disk. In some embodiments, the update package includes updates for both the system partition and the user partition. The update operation in each pass resizes the system partition in order to store system partition data expanded from the corresponding archive piece of that pass. Some embodiments resize the system partition gradually over the multiple passes rather than all at once in order to leave as much as space as possible for user partition during each pass. (The resizing takes space away from the user partition and gives it to the system partition so each resizing grows the system partition while shrinking the user partition by the same amount.)

Figure 12:
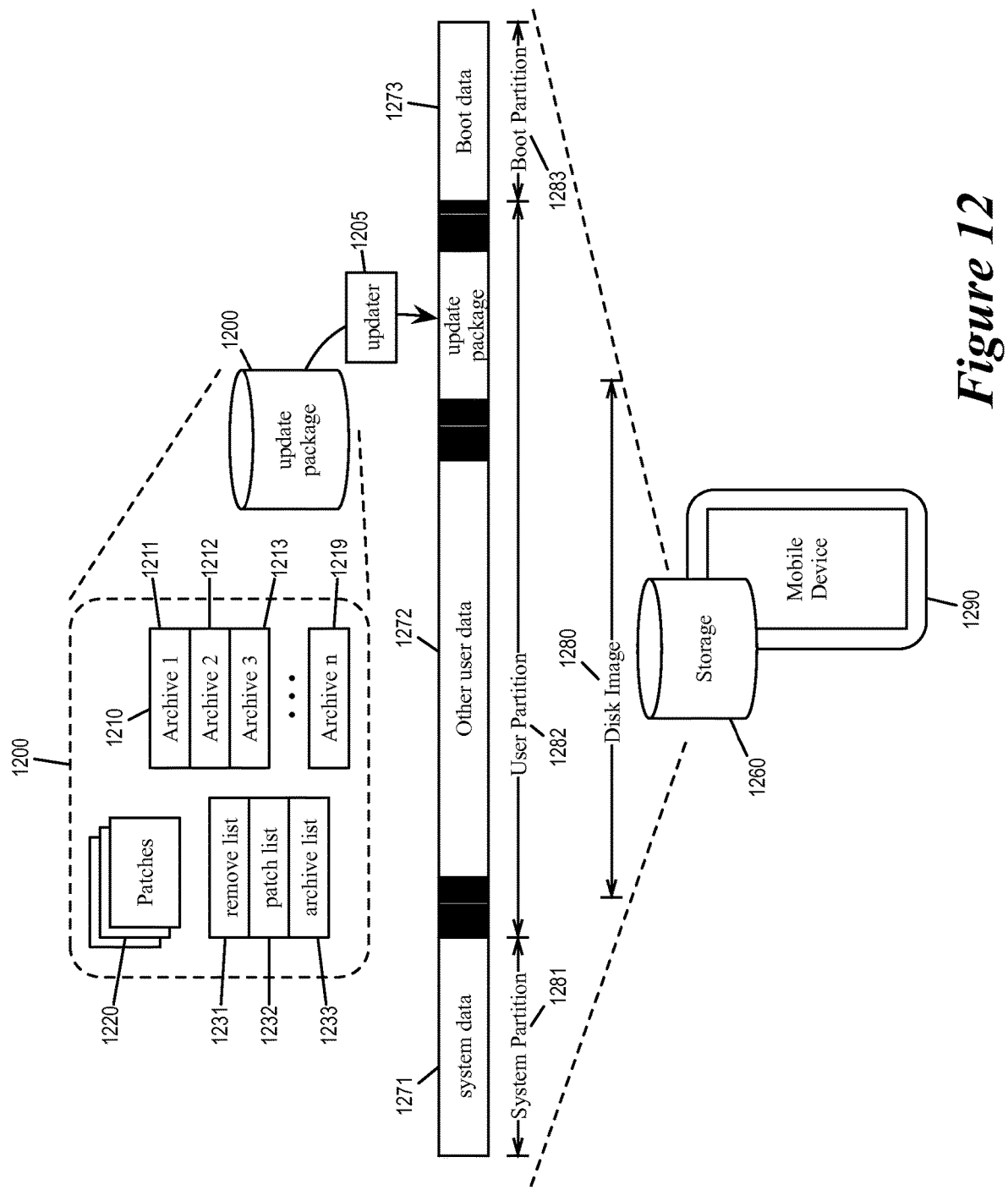
FIG. 12 illustrates an update package for updating a disk image/operating system on a computing device.

For some embodiments, FIG. 12 illustrates an update package 1200 for updating a disk image/operating system on a computing device 1290 (illustrated as a mobile device). The update package 1200 includes archive data 1210 that are partitioned into multiple archive pieces 1211-1219 to be expanded in multiple updating passes. The update package also includes data for patches (patch payload) 1220, as well as a list of files to be removed (remove list 1231), a list of files to be updated by patching (patch list 1232), a list of files to be updated by archive (archive list 1233). The computing device 1290 is executing an updater program or module 1205 for performing the update process based on the update package 1200.

The computing device 1290 has a storage 1260 that is organized according to a disk image 1280. The disk image 1280 of the storage 1260 is partitioned into a systems partition 1281, a user partition 1282, and boot partition 1283. The systems partition 1281 stores systems data 1271 for the operating system of the computing device 1290. It normally boots up to be a read-only partition whose data cannot be altered by user operations. The boot partition 1283 stores boot loader data 1273 that is used for booting the operating system. The user partition 1282 stores user data 1272 and is readable/writeable by user operations. It is also used to store the downloaded update package 1200. As illustrated, the update package 1200 occupies a significant portion of the user partition 1282 and leaves very little free space in the storage 1260.

Figure 13:
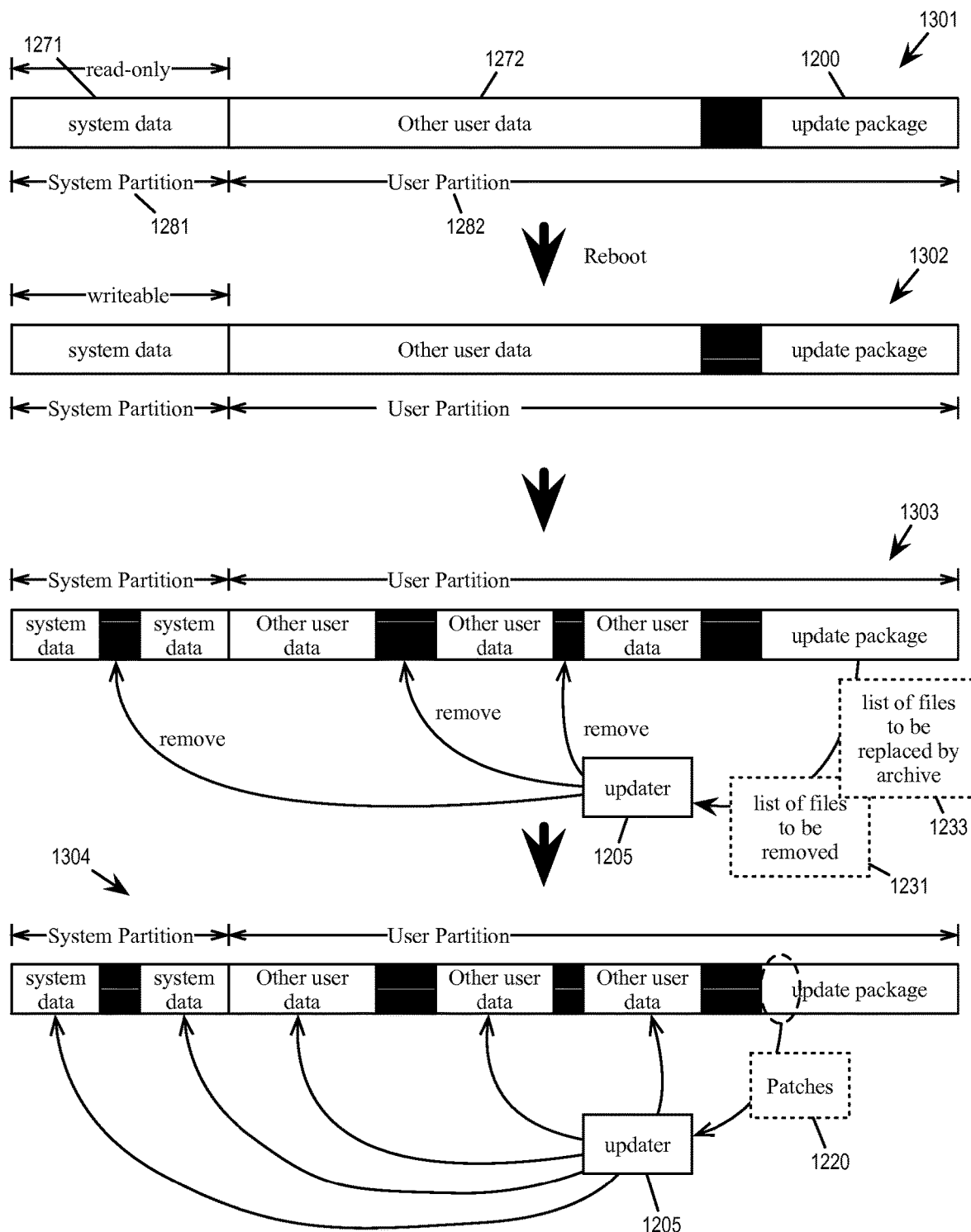
FIG. 13 illustrates operations to free additional disk space before expanding archive pieces.

Before expanding any of the archive pieces, some embodiments perform a series of operations to free up additional space in the disk. These operations includes removing files that are in the list of files to remove, removing files that will be replaced by expanded archives, and perform patching and removing patch payload. FIG. 13 illustrates the operations to free additional disk space before expanding archive pieces. The figure illustrates the disk space freeing operation in four stages 1301-1304. The hashed portion indicates free space.

The first stage 1301 shows the system partition 1281 and the user partition 1282 right after the download of the update package 1200. The update package has all of its components stored in the user partition (i.e., archive pieces 1210, patch payload 1220, lists of files to remove/patch/archive 1231-1233). The system data 1271 and the user data 1272 are as they were before the download of the update package. The system partition is read-only and cannot be altered. In some embodiments, in order to update the system partition, the computing device has to reboot on a different set of boot data and make the system partition writeable. Some embodiments therefore stores alternative boot data into the storage 1260 and initiates reboot to make the system partition writeable. The second stage 1302 shows the disk image 1280 after the reboot operation that makes the system data writeable.

The third stage 1303 shows the updater 1205 using the remove list 1231 and the archive list 1232 to identify and remove the files that can be removed. The files in the remove list are files that are not to be part of the disk image 1280 after update. The files in the archive list are files that will entirely replaced by data in the archives later. Some of the files removed are files in the system partition, which is now writeable. The figure illustrates some of the files removed are in the user partition, though some embodiments only remove files from the system partition in some embodiments. The removal of these files frees up disk space that will be used to store expanded data from the archive pieces 1211-1219.

The fourth stage 1304 shows the updater 1205 using the patch list 1233 to identify files to be patched and using the patch payload 1220 to patch the identified files. The files being patched may increase or decrease in size. In some embodiments, some of these files are large library files (e.g., 32-bit DYLD and 64-bit DYLD) that are updated by using in-place updating described in Section I. After the files in the patch list have been patched, the updater 1205 removes the used patch payload 1220 from the stored update package 1200, thus freeing even more disk space. The figure shows the files being updated includes files in both the system partition and files in the user partition, though some embodiments update only files in the system partition.

Figure 14:
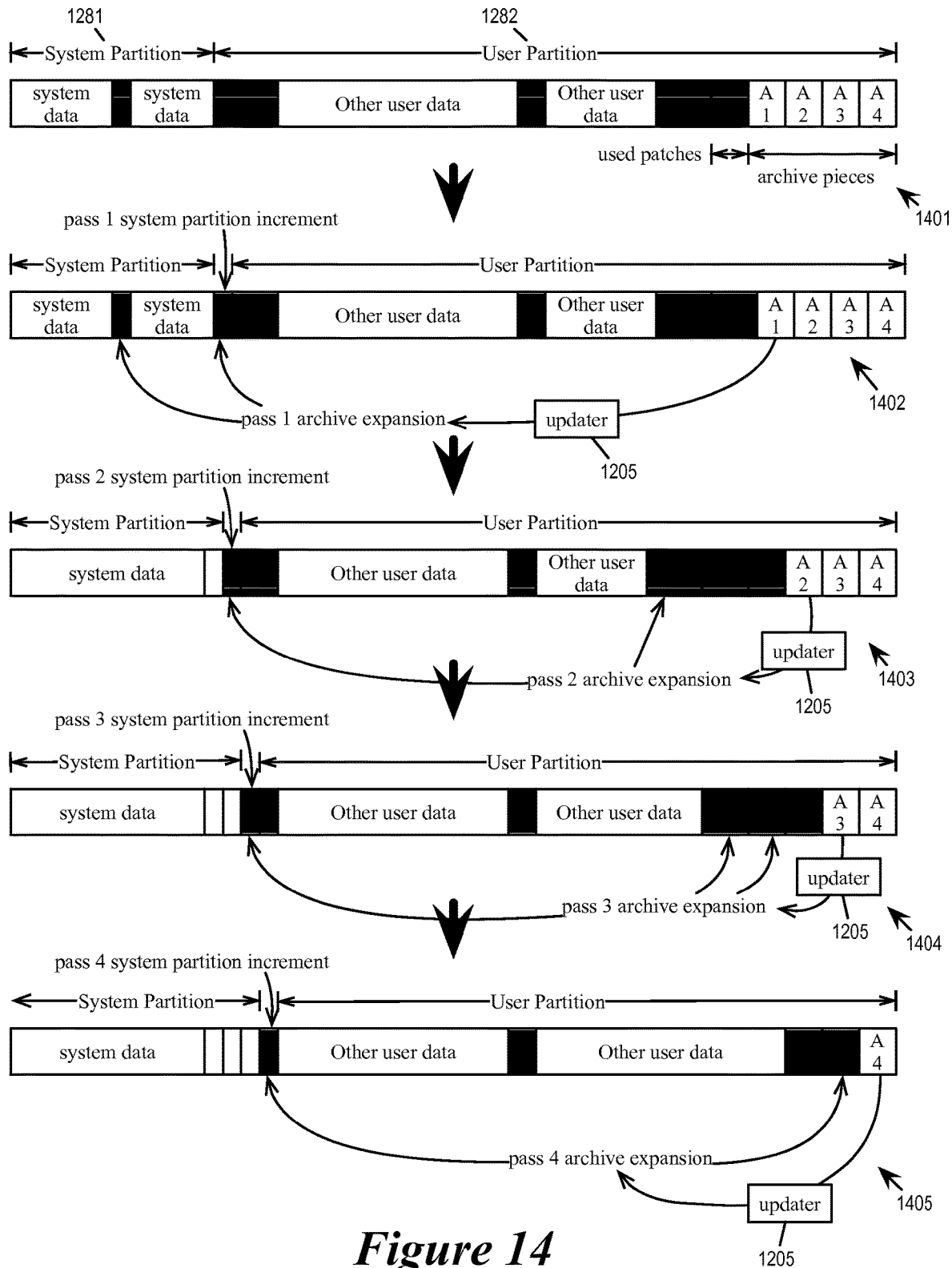
FIG. 14 illustrates the expansion of archive pieces in multiple updating passes.

After the initial freeing of disk space according to the remove list, archive list, and the patch list, the updater 1205 in some embodiments proceed to expand the archive pieces 1211-1219. FIG. 14 illustrates the expansion of archive pieces in multiple updating passes. The figure illustrates the archive expansion operations in five stages 1401-1405.

The first stage 1401 shows the disk image 1280 of the storage 1260 after the initial space-freeing operations described by reference to FIG. 13 above. As illustrated, the disk image 1280 of the storage 1260 has spaces that are freed from the removed files and the removed used patch payload. There are free spaces in the system partition 1281 as well as in the user partition 1282. The first stage also shows the archive pieces 1211-1214 (illustrated as A1-A4) stored in the storage 1260 as parts of the update package are still in the device. Archive pieces 1215-1219 are not illustrated for simplicity.

The second stage 1402 shows the first pass of the archive expansion operation. As illustrated, the updater accesses the archive piece 1211 (A1) and expands its content into the system partition 1281. The stage also shows the resizing of system partition 1281. The resizing takes away free space from the user partition and give it to the system partition in order to make room for system data that are expanded from the archive piece 1211 in this first pass of updating. After completing expansion of the archive 1211, the updater 1205 removes the archive piece 1211 to free more space in the storage 1260 for the subsequent archive expansion passes.

The third stage 1403 shows the second pass of the archive expansion operation. As illustrated, the updater 1205 has removed the archive piece 1211. The updater 1205 accesses the archive piece 1212 (A2) and expands its content into the system partition 1281 and the user partition 1282. The system partition 1281 is resized again order to make room for system data that are expanded from the archive piece 1212 in this second pass of updating. After completing expansion of the archive 1212, the updater 1205 removes the archive piece 1212 to free more space in the storage 1260 for the subsequent archive expansion passes.

The fourth and fifth stages 1404 and 1405 show the subsequent passes (third and fourth passes) of the archive expansion operation. The updater 1205 in each pass (i) resizes the system partition to accept more system data from the archives, (ii) expands an archive piece and stores the expanded content into free space in system and/or user partition, and (iii) removes the used archive piece. The updating passes continues until all archive pieces have been expanded and removed from the storage 1260. The updater 1205 then makes the system portion read only through another reboot and completes the updating process.

FIG. 14 shows expansion of archive pieces into both the system partition 1281 and the user partition 1282. However, in some embodiments, the archive expansion is only for files in the system partition but not files in the user partition. Consequently, in some of those embodiments, the archive expansion process would not alter the content of the user partition.

Figure 15:
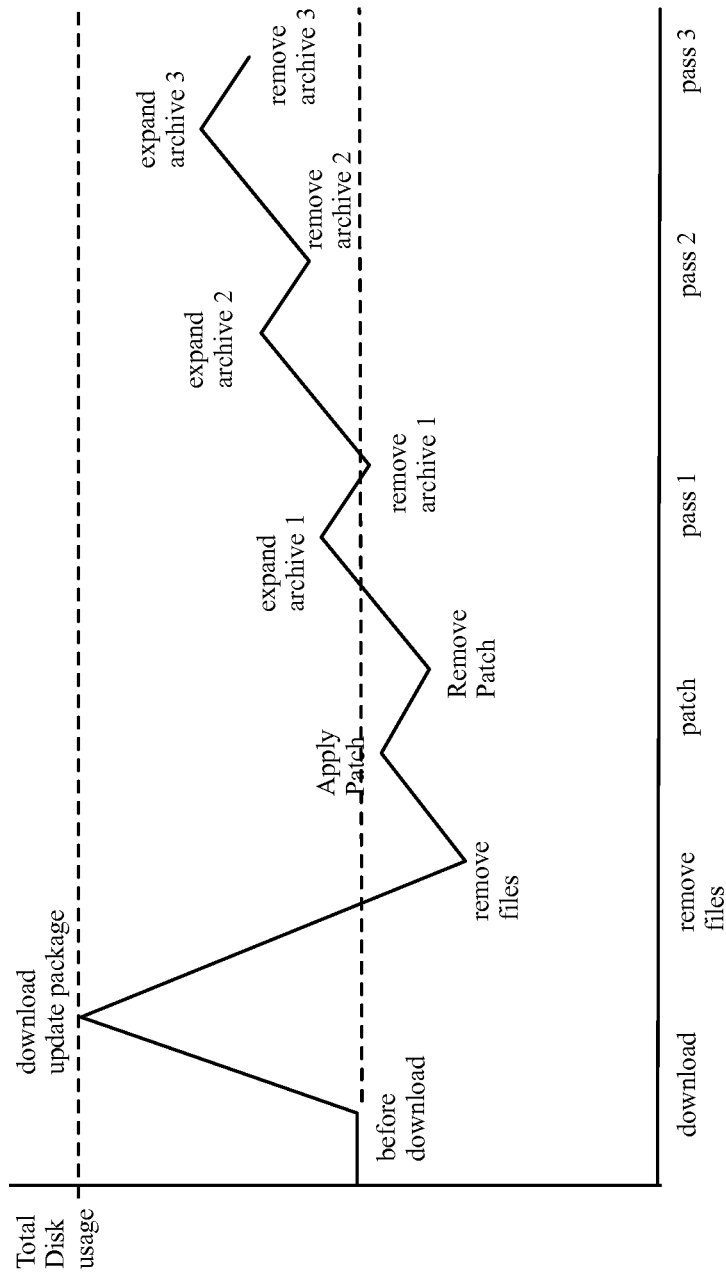
FIG. 15 illustrates the total disk usage throughout the multi-pass archive expansion process.

FIG. 15 illustrates the total disk usage throughout the multi-pass archive expansion process. As illustrated, the disk usage increases significantly following the download of the update package, but then reduces significantly following the removal of the files according to the remove list and the archive list. The total usage increases after patches are applied, and then reduces after the patch payloads are removed. The total usage of the disk then increases following the expansion of the archive piece and reduces following the removal of the archive pieces. The increase-decrease cycle of total disk usage continues through each pass of the multi-pass archive expansions process until the last archive is expanded and removed.

Figure 16:
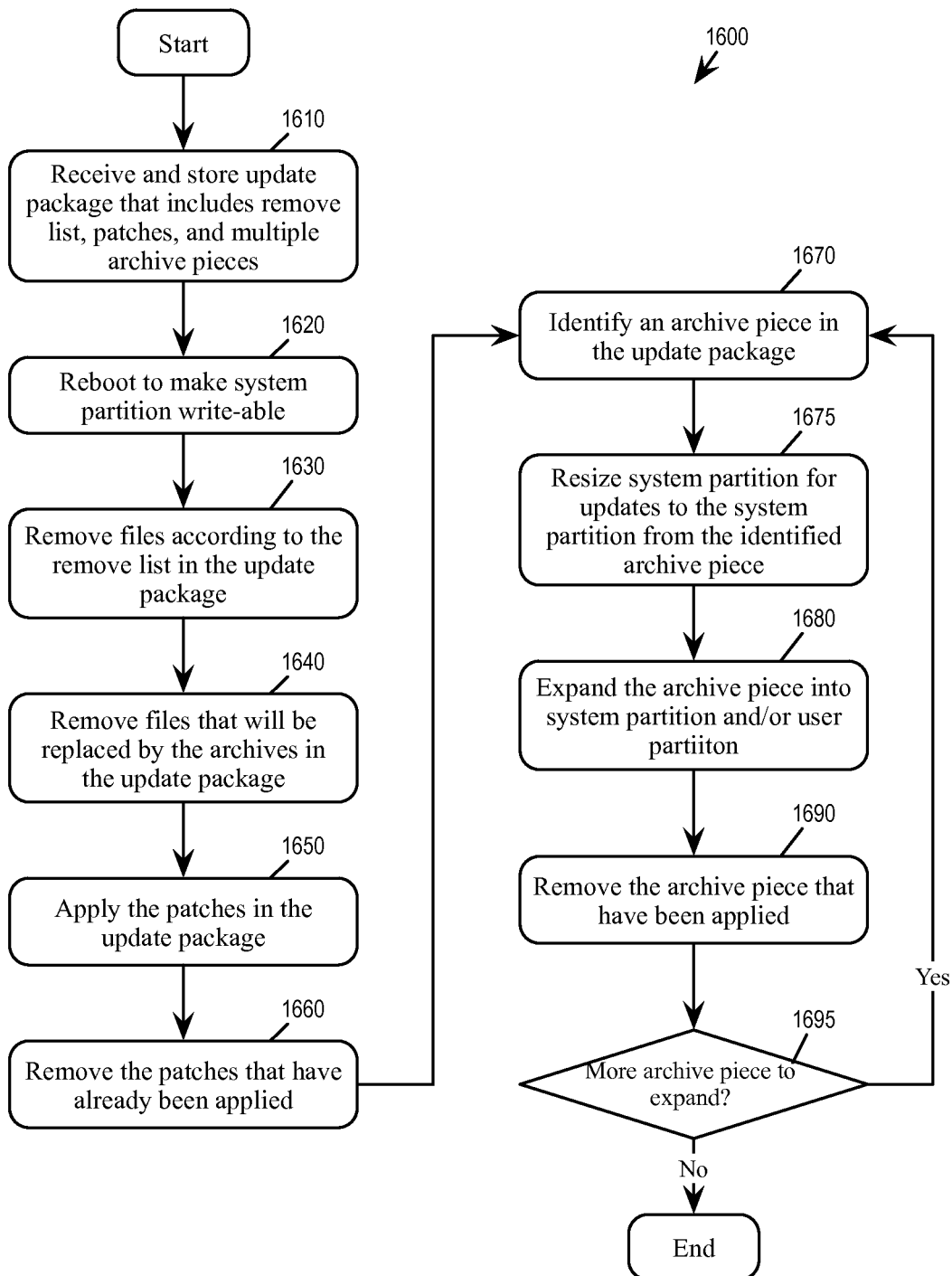
FIG. 16 conceptually illustrates a process for performing multi-pass archive expansion operations.

For some embodiments, FIG. 16 conceptually illustrates a process 1600 for performing multi-pass archive expansion operations. Some embodiments perform this process at a computing device that receives an update package that divides the archive payload into multiple archive pieces.

The process starts when it receives (at 1610) and stores an update package in its storage. The update package includes the a list of files to remove, a list of files to update by patch, a list of files to update by archive, a patch payload, and an archive payload that is divided into several archive pieces. In some embodiments, the package is for updating the entire disk image of the computing device or the operating system running on the computing device. The process then reboots (at 1620) to make the system partition of the storage writeable so the process can remove, add, or modify files in the system partition.

Next, the process removes (at 1630) files from the storage according to the list of files to remove and removes (at 1640) files from the storage according to the list of files to be updated by archive expansion. The process then applies (at 1650) patches provided by the update package and then removes (at 1660) the patch data from the storage.

The process then starts the multi-pass expansion of the archive pieces. The process identifies (1670) an archive piece in the update package for expansion in the current pass. The process then resizes (at 1675) the system partition to accommodate data that are to be expanded from the identified archive piece. The process then expands (at 1680) the identified archive piece into the user partition as well into the resized system partition. The process then removes (at 1690) the archive piece since the data therein has already been expanded and stored.

The process then determines (at 1695) whether there are another archive pieces to expand. If so, the process returns to 1670 for another pass of the multi-pass archive expansion process. Otherwise the process 1600 ends.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
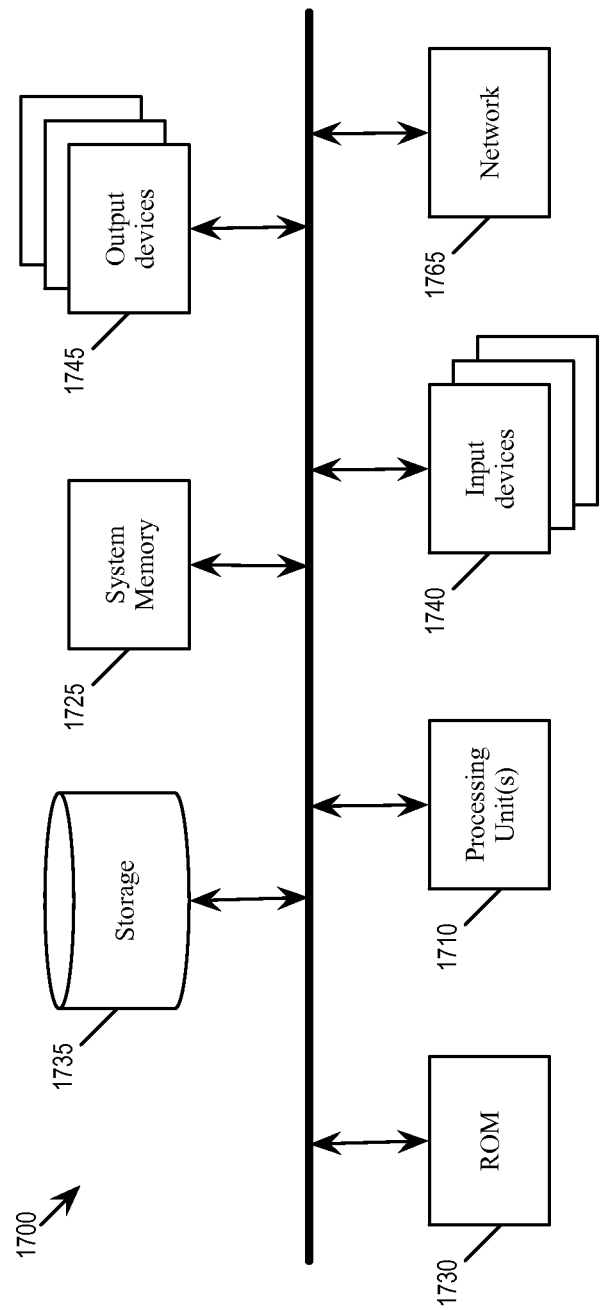
FIG. 17 conceptually illustrates an electronic system with which some embodiments of the invention are implemented.

FIG. 17 conceptually illustrates an electronic system 1700 with which some embodiments of the invention are implemented. The electronic system 1700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash memory device, etc., and its corresponding disk drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6, 7, 9, 11, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for updating a target file stored on a device, the method comprising:

receiving update data for a plurality of sections that are part of a target file without requiring storage on the device of a new version of the target file and old version of the target file and the target file is a component of an operating system of the device;

receiving a segmentation map specifying an update method for each section in the plurality of sections in the target file, wherein the segmentation map is configured to specify at least one of a patch section update to be applied to at least one section or a copy section update to be applied to at least one section, and an archive section update to be applied to at least one section; and updating each section in the plurality of sections in the target file according to the update method specified in the segmentation map for each section, wherein a segment space identified for an archive section update is updated by vacating the segment space as free space and performing an in-place update in the segment space with one of a patch section update or a full section update.

2. The method of claim 1, wherein:

the update data for a section that is specified as being updated by the patch section update comprises difference data between a current version of the section and a prior version of the section that is executing on the device; and the update data for another section that is specified as being updated by full section update comprises compressed data for a current version of the another section, which is to replace a prior version of the another section that is executing on the device.

3. The method of claim 2, wherein the update data for at least one section specified as being updated by the patch section update has no difference between the current version of the section and the prior version of the section.

4. The method of claim 1, wherein the plurality of sections is in an order of increasing sizes.

5. The method of claim 4, wherein the increase in section sizes follows a geometric progression.

6. The method of claim 1, wherein the update data for a section specified as being updated by copy section update does not comprise difference data between a current version of the section and a prior version of the section nor compressed data for the current version of the section.

7. A non-transitory computer readable medium storing executable program instructions which when executed by a device cause the device to perform a method for updating a target file stored on the device, the method comprising:
    receiving update data for a plurality of sections that are part of a target file without requiring storage on the device of a new version of the target file and old version of the target file and the target file is a component of an operating system of the device;
    receiving a segmentation map specifying an update method of each section in the plurality of sections in the target file, wherein the segmentation map specifies a patch section update to be applied to at least one section or a copy section update to be applied to at least one section, and an archive section update to be applied to at least one section; and
    updating each section in the plurality of sections in the target file according to a method specified in the segmentation map for each section, wherein a segment space identified for an archive section update is updated by vacating the segment space as free space and performing an in-place update in the segment space with one of a patch section update or a full section update.

8. The non-transitory computer readable medium of claim 7, wherein:
    the update data for a section that is specified as being updated by the patch section update comprises difference data between a current version of the section and a prior version of the section that is executing on the device; and
    the update data for another section that is specified as being updated by full section update comprises compressed data for a current version of the another section, which is to replace a prior version of the another section that is executing on the device.

9. The non-transitory computer readable medium of claim 8, wherein the update data for at least one section specified as being updated by the patch section update has no difference between the current version of the section and the prior version of the section.

10. The non-transitory computer readable medium of claim 7, wherein the plurality of sections is in an order of increasing sizes.

11. The non-transitory computer readable medium of claim 10, wherein the increase in section sizes follows a geometric progression.

12. The non-transitory computer readable medium of claim 7, wherein the update data for a section specified as being updated by copy section update does not comprise difference data between a current version of the section and a prior version of the section nor compressed data for the current version of the section.

13. A non-transitory computer readable medium storing executable program instructions which when executed by a device cause the device to perform a method for installing software on the device, the method comprising:
    receiving an update file which comprises a plurality of sections that includes a set of one or more patch section updates, a set of one or more copy section updates, and a set of one or more archive section updates, the update file configured to update software in a target file on the device without requiring storage on the device of a new version of the target file and old version of the target file and the target file is a component of an operating system of the device;
    receiving a segmentation map specifying the one or more patch section updates, the one or more copy section updates, and the one or more archive section updates; and
    updating the target file using the segmentation map, wherein a first section of the target file is updated with a patch section update from the set of one or more patch section updates, a second section of the target file is updated with a full section update from the set of one or more full section updates, and a segment space identified for an archive section update is updated by vacating the segment space as free space and performing an in-place update in the segment space with one of a patch section update or a full section update.

14. The medium as in claim 13 wherein the method further comprises:
    rebooting the device after installing the update file; and
    wherein the updated target file is stored on non-volatile memory of the device and is part of an operating system of the device.

15. A method for installing software on a device, the method comprising:
    receiving an update file which comprises a plurality of sections that include a set of one or more patch section updates, a set of one or more full section updates, and a set of one or more archive section updates, the update file configured to update software in a target file without requiring storage on the device of a new version of the target file and old version of the target file and the target file is a component of an operating system of the device;
    receiving a segmentation map specifying the one or more patch section updates, the one or more copy section updates, and the one or more archive section updates; and
    updating the target file using the segmentation map, wherein a first section of the target file is updated with a patch section update from the set of one or more patch section updates and a second section of the target file is updated with a full section update from the set of one or more full section updates, and a segment space identified for an archive section update is updated by vacating the segment space as free space and performing an in-place update in the segment space with one of a patch section update or a full section update.

16. The method as in claim 15 wherein the method further comprises:
    rebooting the device after installing the update file; and
    wherein the updated target file is stored on non-volatile memory of the device and is part of an operating system of the device.

* * * * *